Dec. 1, 1959 N. B. COLEY 2,915,622

AUTOMATIC SWITCHING SYSTEM FOR CLASSIFICATION YARDS

Filed Dec. 20, 1955 15 Sheets-Sheet 1

INVENTOR.

N. B. COLEY

BY Forest B. Hitchcock

HIS ATTORNEY

CODE CHART

| ROUTE TO TRACKS | CONTROLS FOR SWITCH GROUPS | | | |
|---|---|---|---|---|
| | A | B | C | D |
| 1 | N | N | O | N |
| 2 | N | N | O | R |
| 3 | N | R | N | N |
| 4 | N | R | N | R |
| 5 | N | R | R | N |
| 6 | N | R | R | R |
| 7 | R | N | N | R |
| 8 | R | N | N | N |
| 9 | R | N | R | R |
| 10 | R | N | R | N |
| 11 | R | R | O | R |
| 12 | R | R | O | N |

N = ENERGIZATION OF CHANNEL
R & O CHANNEL DEENERGIZED

INVENTOR.
N. B. COLEY
BY Forest B. Hitchcock
HIS ATTORNEY

Dec. 1, 1959 N. B. COLEY 2,915,622
AUTOMATIC SWITCHING SYSTEM FOR CLASSIFICATION YARDS
Filed Dec. 20, 1955 15 Sheets-Sheet 3

INVENTOR.
N. B. COLEY
BY Forest B. Hitchcock
HIS ATTORNEY

Dec. 1, 1959 N. B. COLEY 2,915,622

AUTOMATIC SWITCHING SYSTEM FOR CLASSIFICATION YARDS

Filed Dec. 20, 1955 15 Sheets-Sheet 4

INVENTOR.
N. B. COLEY
BY
Forest B. Hitchcock
HIS ATTORNEY

Dec. 1, 1959 N. B. COLEY 2,915,622

AUTOMATIC SWITCHING SYSTEM FOR CLASSIFICATION YARDS

Filed Dec. 20, 1955 15 Sheets-Sheet 5

INVENTOR.

N.B.COLEY

BY

HIS ATTORNEY

INVENTOR.
N. B. COLEY
BY
Forest B. Hitchcock
HIS ATTORNEY

AUTOMATIC SWITCHING SYSTEM FOR CLASSIFICATION YARDS

Filed Dec. 20, 1955 15 Sheets-Sheet 7

INVENTOR.
N. B. COLEY
BY
Forest B. Hitchcock
HIS ATTORNEY

Dec. 1, 1959 N. B. COLEY 2,915,622

AUTOMATIC SWITCHING SYSTEM FOR CLASSIFICATION YARDS

Filed Dec. 20, 1955 15 Sheets-Sheet 8

INVENTOR.
N. B. COLEY
BY Forest B. Hitchcock
HIS ATTORNEY

Dec. 1, 1959 N. B. COLEY 2,915,622

AUTOMATIC SWITCHING SYSTEM FOR CLASSIFICATION YARDS

Filed Dec. 20, 1955 15 Sheets-Sheet 9

INVENTOR.
N. B. COLEY
BY Forest B. Hitchcock
HIS ATTORNEY

INVENTOR.
N. B. COLEY
BY Forest B. Hitchcock
HIS ATTORNEY

INVENTOR.
N. B. COLEY
BY Forest B. Hitchcock
HIS ATTORNEY

Dec. 1, 1959 N. B. COLEY 2,915,622

AUTOMATIC SWITCHING SYSTEM FOR CLASSIFICATION YARDS

Filed Dec. 20, 1955 15 Sheets-Sheet 12

INVENTOR.
N. B. COLEY
BY Forest B. Hitchcock
HIS ATTORNEY

Dec. 1, 1959 N. B. COLEY 2,915,622

AUTOMATIC SWITCHING SYSTEM FOR CLASSIFICATION YARDS

Filed Dec. 20, 1955 15 Sheets-Sheet 13

INVENTOR.
N. B. COLEY
BY Forest B. Hitchcock
HIS ATTORNEY

Dec. 1, 1959 N. B. COLEY 2,915,622
AUTOMATIC SWITCHING SYSTEM FOR CLASSIFICATION YARDS
Filed Dec. 20, 1955 15 Sheets-Sheet 14

INVENTOR.
N. B. COLEY
BY Forest B. Hitchcock
HIS ATTORNEY

INVENTOR.
N. B. COLEY
BY Forest B. Hitchcock
HIS ATTORNEY

United States Patent Office
2,915,622
Patented Dec. 1, 1959

2,915,622

AUTOMATIC SWITCHING SYSTEM FOR CLASSIFICATION YARDS

Nelson B. Coley, Rochester, N.Y., assignor to General Railway Signal Company, Rochester, N.Y.

Application December 20, 1955, Serial No. 554,231

9 Claims. (Cl. 246—134)

This invention relates to railway switch control systems and relates more particularly to systems wherein switches are controlled in accordance with route descriptions selected by manually operable means.

In control systems for railway classification yards it is often expedient to select routes for individual cars, or cuts of cars, by manually operable means for selecting classification track destinations for each cut of cars. Route descriptions are then stored in banks of relays or other storage means which are provided for each track switch; and such descriptions are advanced from one storage means to another in response to the passage of associated cuts of cars over detector track sections associated with individual track switches.

In automatic switching systems such as that disclosed in the U.S. Patent No. 2,700,728 of Brixner et al., dated January 25, 1955, route descriptions are selectively transferred between storage relay banks associated with successive track switches. The transfer of route descriptions is dependent upon the existence of correspondence between the actual position of each track switch and the position called for by respective route descriptions. The position of each track switch is detected by normally energized switch repeater relays, one relay being associated with each track switch position.

Since classification yard control systems usually operate on direct current energy and since such energy is supplied by generators or other sources of direct current which depend on commercial power, standby storage batteries are usually provided for use during times when commercial power failures occur. It is therefore desirable to reduce the steady energy requirements for a classification yard control system to a minimum in order to reduce the requirements for standby apparatus. A reduction in energy requirements also permits longer periods of operation when standby power apparatus is in use.

An automatic switching system such as that described in Brixner et al. includes means for automatically cancelling route descriptions for cuts of cars whenever a track switch included in a route fails to respond to a preselected control because of an obstruction, an open control circuit, or other similar occurrences. Since one criterion for the transferring of a route description is the existence of correspondence between actual and called-for switch positions, an incomplete or forestalled switch operation could result in the continued storage of the route description in the storage relay bank associated with the track switch after the associated cut of cars had departed. Under these conditions subsequent route descriptions would no longer be related to respective cuts of cars. Therefore, a relay is provided to detect improper routing conditions and to automatically cancel route descriptions which cannot be advanced in the circuit network.

A further feature provided in general practice is means for insuring that only one route description can be transferred per cut of cars. In other words, since multiple storages may be provided for each track switch location, a detection means must be provided to make sure that each cut of cars transfers only its associated route description and not the route descriptions associated with following cuts of cars.

In view of the preceding considerations an object of the present invention is to provide an automatic switching system in which all switch repeater relays and all relays associated with description storages and transfers are normally deenergized.

Another object of this invention is to provide automatic means for cancelling route descriptions without providing particular apparatus for accomplishing such cancellations.

Another object of this invention is to provide circuit means for insuring the transfer of only one route description per cut of cars without providing particular apparatus for performing such functions.

A further object of this invention is to provide improved means for permitting the introduction of route descriptions into storage relay banks at times when the associated detector track sections are occupied.

Other objects, purposes and characteristic features of the present invention will be in part obvious from the accompanying drawings, and in part pointed out as the description of the invention progresses.

In describing the invention in detail, reference will be made to the acompanying drawings, in which like reference characters designate corresponding parts throughout the several views, and in which.

Figures 3, 4:
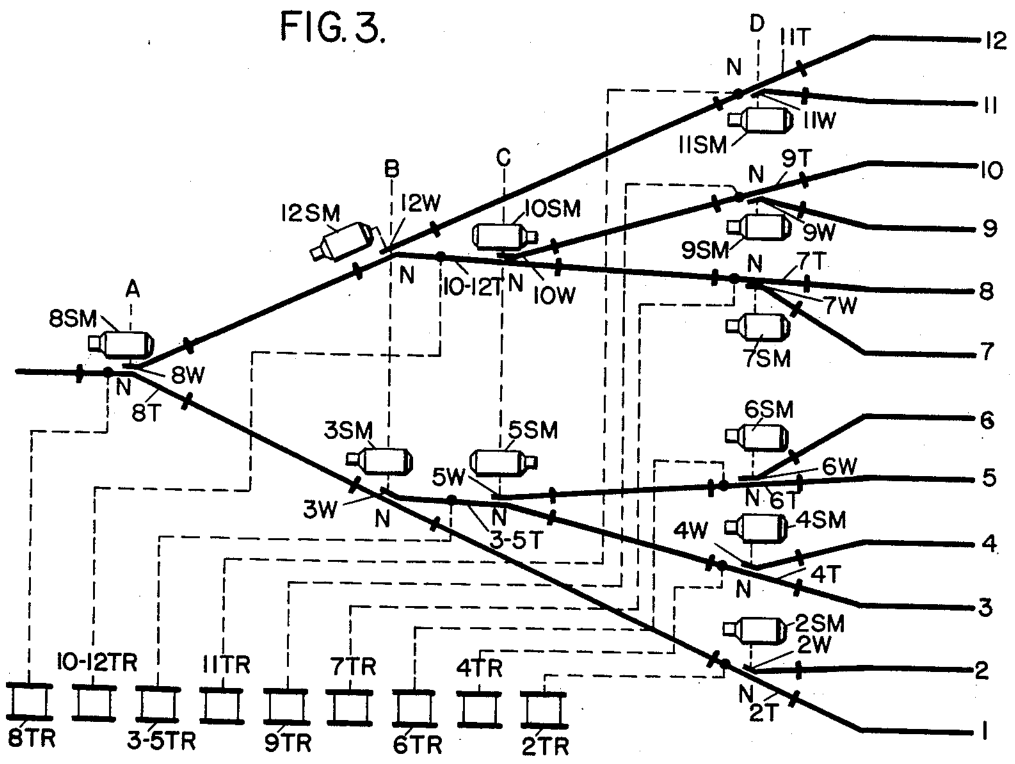
Fig. 3 represents in single line form a classification yard to which one embodiment of the present invention can be applied.
Fig. 4 is a code chart indicating the manner in which particular route storage relays are controlled for particular selected route descriptions.
Figure 6:
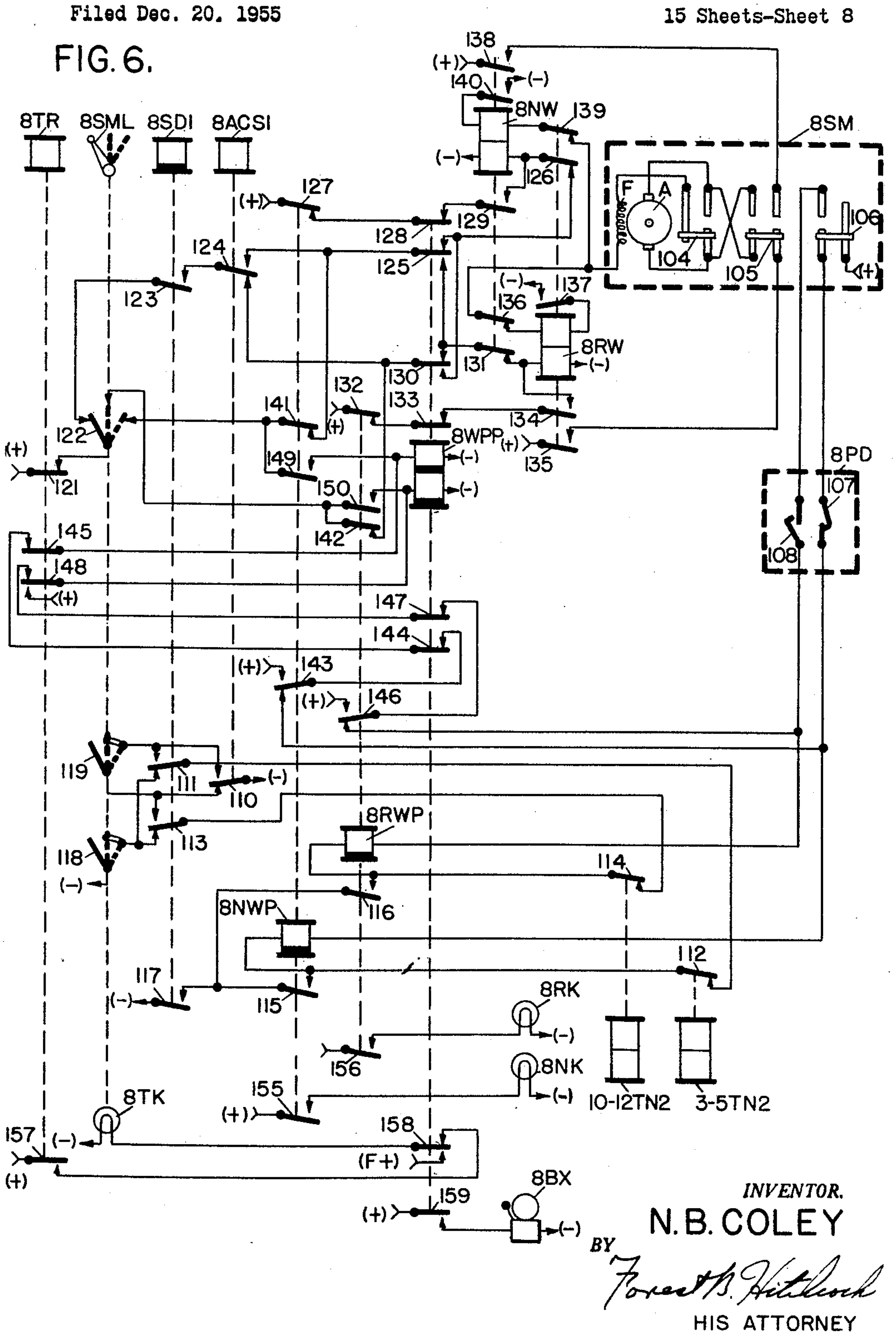
Figure 7A:
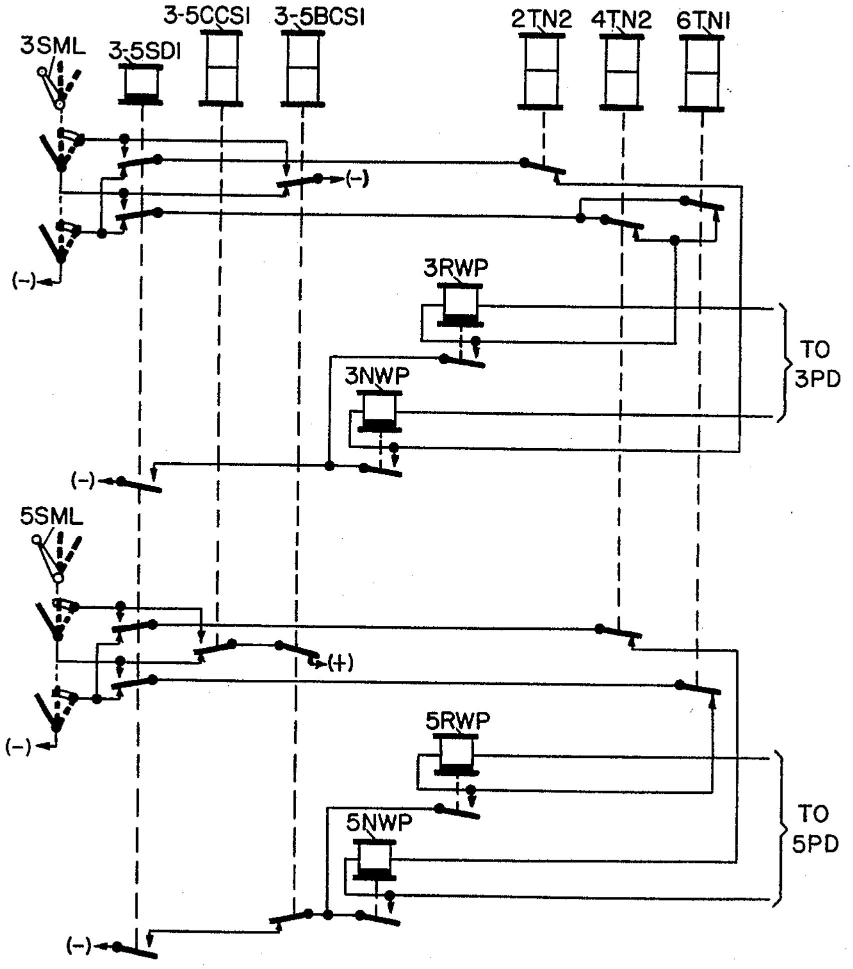
Figure 7B:
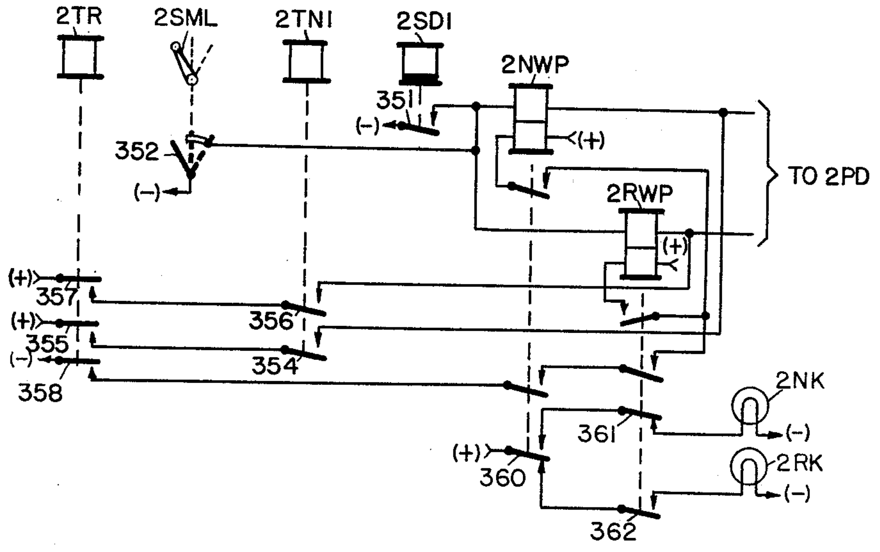
Figure 7C:
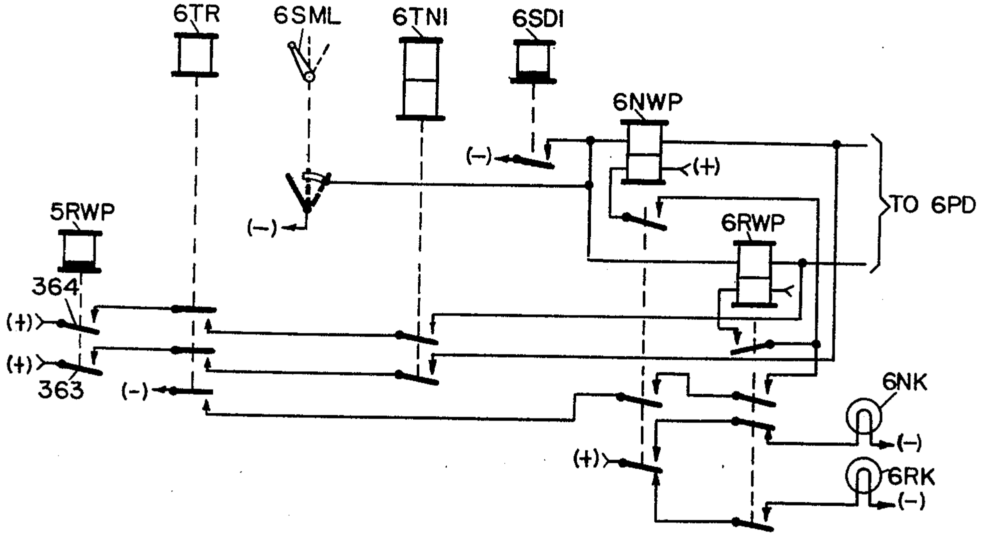
Figure 9B:
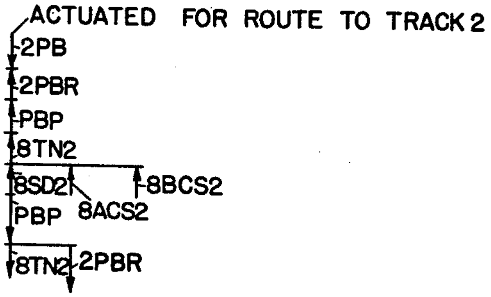
Figure 9C:
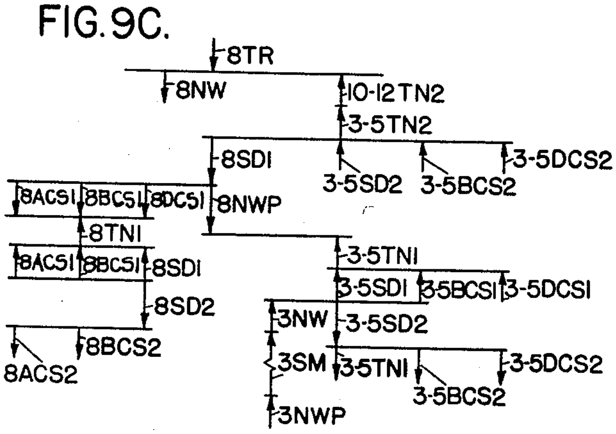
Figure 9D:
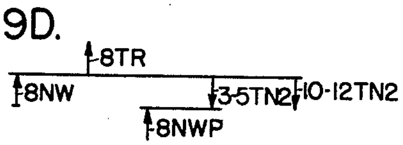
Figure 10:
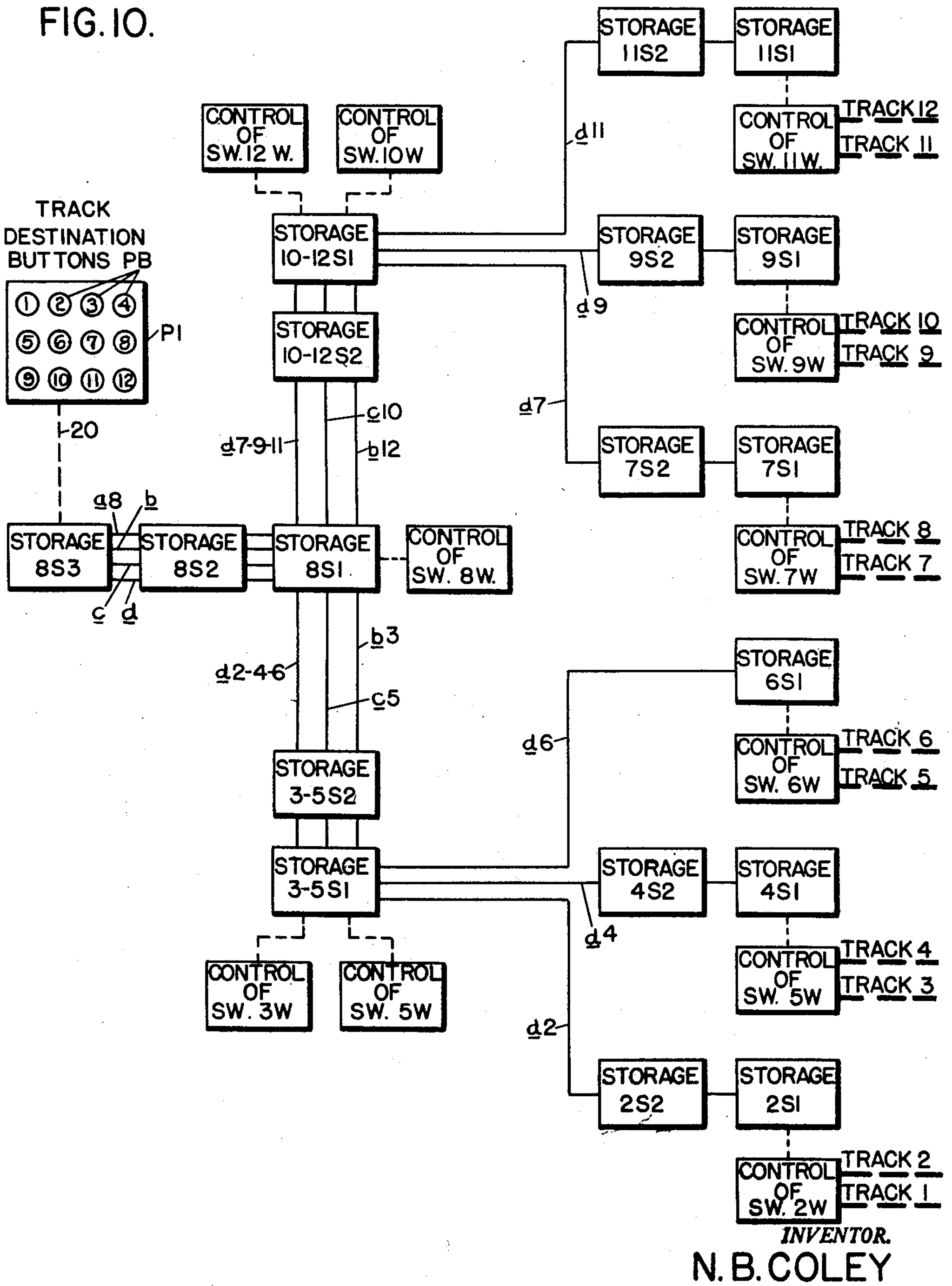

Figs. 5A–5E when placed together show diagrammatically circuits for the storage and transfer of route descriptions for routes through the classification yard shown in Fig. 3;

Fig. 6 shows diagrammatically switch control circuits for the first switch in the classification yard of Fig. 3, and further shows controls for the normally deenergized switch repeater relays associated with the first switch;

Fig. 7A shows diagrammatically the circuits for controlling the switch repeater relays associated with a lap switch location;

Fig. 7B shows diagrammatically circuits for controlling the switch repeater relays associated with a track switch which leads directly to classification tracks, it being assumed that two route descriptions can be stored at such a switch location;

Fig. 7C shows diagrammatically circuits for controlling the switch repeater relays associated with a track switch leading directly to calssification tracks, it being assumed that only one route description can be stored at such a switch location;

Figs. 8A–8M illustrate by single line diagram the progress of two successive cards through the classification yard illustrated in Fig. 3;

Figs. 9A–9M show sequences of relay operation when the two cars shown in Figs. 8A–8M pass through the classification yard; and Fig. 10 illustrates by block diagram the routing of respective switch controls through respective storage units;

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be used in practice. Thus, the various relays and their contacts are illustrated in a conventional manner, and symbols are used to indicate connections to the terminals of batteries, or other sources of electric current, instead of showing all of the wiring connections to these terminals.

The symbols (+) and (—) are employed to indicate the positive and negative terminals, respectively, of suitable batteries, or other sources of direct current; and the circuits with which these symbols are used always have current flowing in the same direction as indicated by the direction of the arrows. The symbol F+ indicates connections to the positive terminal of a suitable battery or other direct current source through the contacts of a flasher or other interrupting means.

The track equipment is provided according to usual practice in classification yards of this character, the track switches being operated by suitable power switch machines, and each track switch having associated therewith a detector track section for preventing movements of the track switch under a car. The detector track sections also serve purposes to be made more readily apparent as the description progresses with respect to the transfer of route storages as respective cuts of cars progress through the yard.

With reference to Fig. 3, the track layout for which this embodiment of the present invention is provided is shown to have 12 classification tracks which are reached through successive track switches fanning out to these tracks from the hump. The track switch 8W is the first switch off the hump and is conveniently referred to as being provided at switch location A. The lap switches 3W and 5W are next to be encountered, respectively, upon movements by cars through the switch 8W in its normal position; and the switches 12W and 10W are the next to be encountered by cars passing through the switch 8W in its reverse position. The track switches 5W and 10W are included in a route only provided that the switches 3W and 12W associated therewith are in their respective reverse and normal positions. The track switches 3W and 12W are considered as being at switch location B, while the switches 5W and 10W are considered as being at switch location C. Respective switches 2W, 4W, 6W, 7W, 9W and 11W are located along a switch location line D, and these switches are the last to be operated for any established routes. From the organization of the yard as described, the four switch location reference positions A, B, C and D running transversely with respect to the yard can be considered as a means for identifying the order in which track switches are encountered by respective cuts of cars, and thus the order in which the track switches are operated as cuts of cars progress through the yard. It can be noted that the track switches, rather than being numbered in sequence as they are encountered by pasing cars, are numbered in a manner which, by cooperating with the normal positions of the respective track switches as shown, provides that the operation of any single track switch to its reverse position is effective to direct a car proceeding through that track switch to the corresponding numbered track. For example, if the track switch 8W is operated to its reverse position while all other of the track switches are in their normal positions a car will be routed to track 8. This condition is found to be true with respect to the passage of cars through any of the other track switches lying in their respective reverse positions. This manner of numbering the track switches is chosen primarily to facilitate an understanding by the operator as to what track switches must be operated to their reverse positions for routing cars to their respective destinations under conditions wherein the classification of the cars is accomplished by the manual operation of switch control levers rather than by automatic operation.

In accordance with general practice, the yard has a hump conductor stationed near the hump. Located at that station is a suitable control panel such as the panel P1 illustrated in Fig. 1, having a bank of self-restoring push buttons PB, one push button PB being provided for each of the classification tracks in the yard.

In addition to these push buttons, a cancel push button 8CNB is provided as a means for manually cancelling respective route storages associated with the control of the track switch 8W. A cancel push button CNB is provided on the panel for cancelling all route storages and thus clearing the entire system. Indicator lamps 8SK1, 8SK2 and 8SK3 are provided on the hump conductor's control panel as a means for indicating which of the three storages associated with the first track switch (track switch 8W) are active in storing route descriptions.

Figures 1, 2:
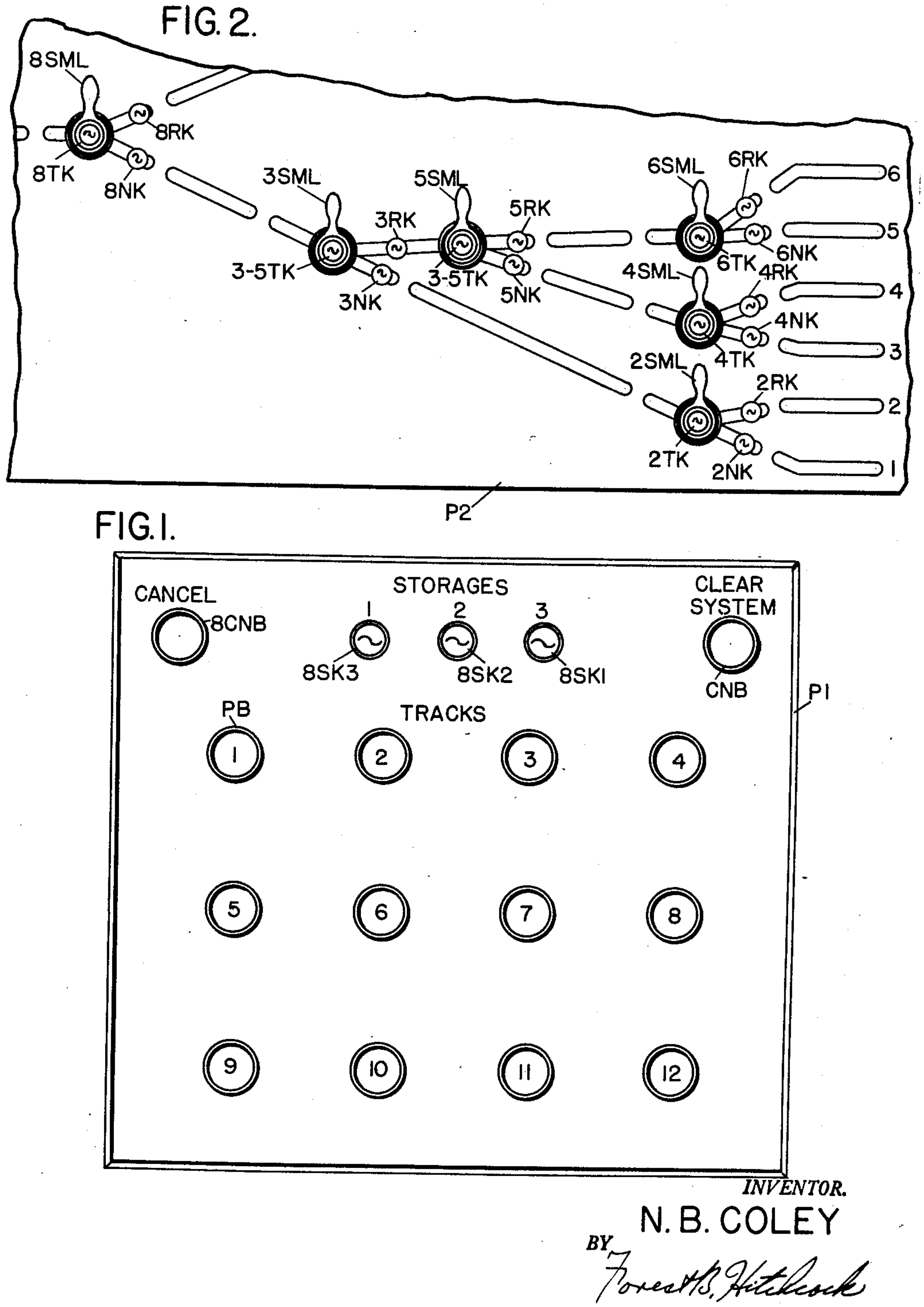
Fig. 1 is a plan view of a control panel located at the entrance to a classification yard and shows various route selection push buttons, route storage cancellation push buttons and indication lights associated with the storage of route descriptions.
Fig. 2 shows diagrammatically a portion of a control panel which includes various levers and indicating lights associated with the manual, or direct, control of track switches.

The portion of the control panel P2 illustrated in Fig. 2 is indicative of a suitable means provided for selectively determining whether or not the control of the track switches is performed manually or automatically. A panel of this type is usually provided for a yard operator under whose jurisdiction car retarders or other track braking equipment are placed. The panel P2 is provided with indicator lamps for indicating the positions of the respective track switches as defined by either manual or automatic controls. Thus, switch control levers 8SML, 3SML, 5SML, 2SML, 4SML and 6SML are provided for the operation of the respective track switches 8, 3, 5, 2, 4 and 6. The levers SML each have contained therein a suitable indicator lamp which is controlled according to circuits to be described so as to indicate occupancy of the associated detector track sections, and these associated indicator lamps also indicate by flashing energization when respective track switches fail to complete operations because of obstructions or other reasons.

The respective switch levers SML as illustrated in Figs. 2, 5C, 5D and 5E are of the three-position rotary type. The lever 8SML when positioned in its left-hand position renders the track switch 8W responsive to automatic controls, when in its center position causes the operation of the track switch 8W to its reverse position, and when in its right-hand position causes the operation of the track switch 8W to its normal position. In Fig. 2 the levers SML are all shown in their left-hand positions wherein the lever handles point upward and are off the track diagram. The respective center and right-hand positions are assumed to require the lever handles to lie coincident with the track diagram. The other switch levers operate in the same manner as the lever 8SML except that their respective center and right-hand positions are associated with either normal or reverse track switch controls, depending on the track layout as shown in Fig. 3. All of the levers SML have normally closed contacts which can be broken by pulling out the associated levers against spring bias, these contacts being used for the purpose of cancellation of route descriptions in a manner to be more readily apparent when the mode of operation of the system is described specifically.

The system control apparatus organization is illustrated by the block diagram of Fig. 10 as comprising route storage units S which are associated with the control of the respective track switches. Each of the storage units S comprises a bank of code storage relays CS, one storage relay being provided for each track switch that a car may encounter in a route from and including the track switch associated with the particular storage unit.

Thus, for the first three storage units 8S1, 8S2 and 8S3, there are four storage relays provided in each unit, this being the number of track switches which may be required to operate in forming a route emanating from the hump. These three storages are activated in response to controls set up for the respective control wires *a8*, *b*, *c*, *d*, in response to the actuation of the track designation buttons PB on the hump conductors control panel P1. These four control wires can be considered as being associated with the respective transverse switch location lines A, B, C and D of the yard layout of Fig. 3. It is, therefore, provided that the wire *a8* is associated with the control of the track switch 8W, the other three wires being associated with the governing of the position of track switches of the respective switch groups B, C and D as a car progresses.

The storage unit 8S1, comprising code storage relays 8ACS1, 8BCS1, 8CCS1, and 8DCS1 (see Figs. 5B and 5C) and suitable switch control relays 8NW, 8RW, 8NWP, 8RWP and 8WPP (see Fig. 6) are provided for directly governing and indicating the operation of the track switch 8W in accordance with route descriptions stored by the storage bank 8S1. The storage bank 8S2, comprising relays 8ACS2, 8BCS2, 8CCS2 and 8DCS2, and the storage bank 8S3, comprising relays PBR and PBP, are provided as a means for storing additional route descriptions which may be designated before a route description stored by the storage unit 8S1 is transferred in response to the passage of a car for which that route description has been set up. It will be readily apparent that the number of storages to be provided initially is arbitrary and dependent upon the facilities desired for setting up route designations for respective cuts of cars approaching the track switch 8W.

It can be pointed out that the space between successive track switches (except for lap switches) may be great enough to require a plurality of route description storage means. In other words, the number of storage means between successive track switch locations should be equal to the number of cuts of cars which can be spaced between the detector track sections associated with successive switches under normal conditions. In the case of lap switches, a common bank of storage relays is provided. In other words, the lap switches 3W and 5W (and 10W and 12W) are controlled by individual code storage CS relays which are parts of a common bank of relays.

It will be noted according to Fig. 10 that there are only three control wires carrying the route descriptions to the storage units associated with the lap switches 3W—5W and 10W—12W because at this particular point along a route extending from the hump, the control for the track switch 8W has already been executed and thus the switch control wire *a8* is no longer required. Therefore, the route description carried in to the next storage requires three wires instead of four. The selection as to whether these three wires are directed to the storage units for one pair of lap switches or the other is selected in accordance with the operated position of the track switch 8W. The wire *b3* coming out of the storage 8S1 feeds the storages for the track switch 3W, and the wire *b12* coming out of the storage 8S1 feeds the storages for the track switch 12W. These respective storage units for the lap switches are required to have only three storage relays each, one for each successive track switch to be controlled for the remainder of a route from switch 8W, in correspondence with the number of route description control wires feeding the storage units. The power operation of the lap switches in accordance with route description storages transferred to the associated storage units is accomplished through switch control relays comparable to those which have been described as being associated with the track switch 8W.

Since two of the switch controls for a route description are utilized by the lap switches, the next storage units are fed only by single route description control wires *d*, as only one more track switch is required to be positioned to complete a route after the positioning of the lap switches. Similarly, since there is only one more track switch to be controlled, each of the lap storage units employed is required to have only one code storage relay CS for succeeding switches.

For reasons which will be apparent as the description progresses, only one storage relay bank is provided for the track switch 6W.

The transfer of route descriptions from the storage unit S1 for the lap switches involves selection by the switch position repeater relays NWP and RWP of these lap switches so that three wires for the control of respective track switches at switch location D are fed from the lap switch storages by distinctive circuit selections, the transfer being routed over but one of these three channels for any one route description. If the lap switches 3W and 5W are positioned in their normal positions, for example, the route control for switch 2W is selected, and transfer is accomplished over the wire *d2* to the storage units 2S1 and 2S2 which are associated with the control of the switch 2W. The switch 2W is provided with switch control and switch position indication relays comparable to those which have been described as being associated with the control of the track switch 8W.

Associated with each of the storage units S as illustrated in Fig. 10 are suitable storage detection relays SD, transfer relays TN, and cancellation relays CN. The storage detection relays SD are made slow acting for purposes to be described when considering the specific mode of operation of the system and from reference to the sequence charts of Figs. 9A–9M.

Each of the single track switches and each pair of lap switches has associated therewith a conventional detector track circuit having a normally energized track relay TR.

Having considered the general organization of apparatus provided in the switch control system for one embodiment of the present invention, more specific consideration of the system will now be given with reference to the mode of operation upon consideration of typical operating conditions.

*Operation*

Before considering specifically the respective circuits involved, a brief consideration will be given to the mode of operation of the system with reference to the block diagram of Fig. 10. As indicated by the dotted line 20 of the block diagram, the actuation of a push button on the hump conductor's push button panel P1 sets up a route description storage in the storage unit 8S3 comprising four characters for the respective transverse groups of switches A, B, C and D as indicated on the track diagram of Fig. 3. The route description is set up in accordance with the energization of respective wires *a8*, *b*, *c* and *d* for these four groups, the energization of one of these wires being indicative of the designation for a track switch of the associated group A, B, C or D being required to be operated to its normal position in order to set up the route designated. Thus, with reference to Figs. 3 and 4, if the push button 1PB (see Fig. 5A) is actuated for designation of a route to track 1, selected track switches of groups A, B and D must be operated to their normal positions, but no track switch of group C is required to be operated, because none of these track switches is included in the route under consideration. It is therefore provided, with reference to Fig. 10, that the actuation of the button on the panel P1 for designation of a route to track 1 sets up a route description calling for normal controls for switches of groups A, B and D, and if it is assumed that the storage unit 8S2 is not in use at this time, energy is immediately applied to the wires *a8*, *b* and *d* by way of transferring the route description code from the storage 8S3 to the storage 8S2. Similarly, if the storage 8S1 is not in use at this time, transfer of the route description is effected by the energization of corresponding control wires connecting the storage 8S2 with the storage 8S1.

Upon the setting up of the storage for the route description in the storage unit 8S1, energy is applied to the switch 8W to operate it to its normal position (in case it was last operated to its reverse position) in accordance with the storage 8S1 having had energy applied thereto by the energization of the wire *a*8 which is associated with the control of the track switch 8W to its normal position. If, at the time of transfer of storage of the route description to the storage 8S1, the wire *a*8 had not been energized, it would have been selected that the switch 8W would be operated to its reverse position.

After the switch 8W has been positioned in accordance with the route description stored by the storage unit 8S1, there is no further operation of the system to transfer the route description to other storage units until the entrance onto the detector track section of the track switch 8W by a car for which the route description has been set up. When this detector track section becomes occupied, transfer is effected from storage unit 8S1 to either storage unit 10–12S2 or storage unit 3–5S2, depending upon the operated position of the track switch 8W. Thus, if the track switch 8W has been operated to its normal position in response to a corresponding description storage, the transfer is made from the storage unit 8S1 to the storage unit 3–5S2 which has its relays conditioned in accordance with the energization of the control wires *b*3, *c*5 and *d*. The energization of the wire *b*3 is indicative of the track switch 3W being called for in the route description to be operated to its normal position, and the energization of the wire *c*5 is indicative of the track switch 5W being required to be operated to its normal position; the lack of energization of either of these wires determines that the associated track switches will eventually be operated to their reverse positions when the route description has been transferred to the route storage unit 3–5S1, except that the track switch 5W is not operated if it is not included in the route. The energization of the control wire *d* is indicative of some track switch of the group D (see Fig. 6) being required to be operated to its normal position, and the deenergized condition of this wire at time of transfer is indicative of the operation of such switch to its reverse position. It has not been chosen at this point in the operation of the system as to which of the track switches of the Group D is to be operated because that selection can be made only after the track switches 3W and 5W have been operated to their required positions.

If the storage unit 3–5S1 is not in use, the route description which has been considered as being set up in the storage unit 3–5S2 is immediately transferred to the storage unit 3–5S1. Upon this transfer (for the route to track 1), the track switch 3W is operated to its normal position, assuming the associated detector track section to be unoccupied by a car at this time. Upon the completion of operation of this track switch, selection is made by the switch repeater relay 3NWP as to which track switch of the group D is to be operated, but no transfer of the route description from the storage unit 3–5S1 is made until a car enters the detector track section for the lap switches 3W and 5W.

When a car enters the detector track section for the switches 3W and 5W, transfer is effected to storage unit 2S2, 4S2 or 6S1, dependent upon the positions of the respective switches 3W and 5W. For the route under consideration to track 1, the route is through the track switch 3W in its normal position, and therefore the transfer is to the storage unit 2S2, and the energization of the wire *d*2 feeding this unit is indicative of the track switch 2W being required to be operated to its normal position for the route extending to track 1. If this wire were deenergized at the time of transfer to storage unit 2S2, it would be determined that the track switch 2W would be required to be operated to its reverse position.

If it is assumed that the storage unit 2S1 is not in use, the remaining portion of the route description calling for the position of the track switch 2W is transferred from the storage unit 2S2 to the storage unit 2S1, and upon being set up in the storage unit 2S1, the track switch 2W is power-operated in accordance with the control set up, provided that the associated detector track section is unoccupied by a car.

Inasmuch as there is to be no transfer made from the storage unit 2S1, since this storage is provided for the last track switch to be positioned for the route, cancellation of the storage in the unit 2S1 is made upon the entrance of a car into the detector track section, and thus the storage unit 2S1 is conditioned so that there can be a transfer made to that storage unit from the storage unit 2S2 for another description.

Having thus considered the general mode of operation of the system with particular reference to the setting up of a particular route, it will be readily apparent that the mode of operation which has been described is typical of the mode of operation that would be provided for the setting up of other routes through the classification yard.

*Route descriptions*

The storage means 8S3 consists of twelve push button repeater relays 1–12PBR. These relays can be energized in response to actuations of respective push buttons 1–12PB located on the hump conductor's panel P1 (see Fig. 1). Assuming that a cut of cars is to be routed to classification track 1, the hump conductor actuates the track push button 1PB. Relay 1PBR is then energized by a pick-up circuit (see Figs. 5A and 5B) extending from (+) including back contact 21 of relay 8TN2, back contact 22 of relay PBP, wire 23, contact 24 of the push button 1PB and the winding of relay 1PBR to (—). Similar pick-up circuits for the remaining relays 2–12PBR can be traced and which include contacts of the respective track push buttons.

When relay 1PBR becomes energized its front contact 25 closes a pick-up circuit for the repeater relay PBP, this pick-up circuit also including wire 25*a*, front contact 26 of the cancellation button CNB, either back contact 27 of relay 8TN2 or 28 of relay 8SD2 and back contact 29 of the cancellation relay 8CN3. Back contact 22 of relay PBP opens in the previously described pick-up circuits for relays 1–12PBR. Front contact 30 of relay PBP then closes a stick circuit for whichever one of the relays PBR is energized. In the case of relay 1PBR, its stick circuit can be traced from (+) including front contact 30 of relay PBP, wire 30*a*, back contacts 31–41 of relays 12PBR, 11PBR, 10PBR, 9PBR, 8PBR, 7PBR, 6PBR, 5PBR, 4PBR, 3PBR, 2PBR, respectively, front contact 42 of relay 1PBR and the winding of relay 1PBR to (—). The relays 1–12PBR are assumed to be slow acting in releasing their armatures and are therefore capable of retaining their armatures during the interval between the opening of back contact 22 of relay PBP and the closing of front contact 30 of relay PBP.

When relay PBP becomes energized it indicates the storage of a route description in the storage means 8S3. The presence of such a storage is indicated by the storage indicator lamp 8SK3 which is energized by the closing of front contact 45 of relays PBP.

The description stored in the storage unit 8S3 can now be transferred to the storage unit 8S2 if no previous storage already exists in the latter unit. The wires *a*8, *b*, *c*, and *d* which connect the two storage units are selectively energized by contacts of the various PBR relays in accordance with the code chart of Fig. 4. Considering the selection of a route to track 1 the energization of relay 1PBR results in the closing of front contacts 46, 47 and 48 of relay 1PBR in circuits which include the wires $a8$, $b$ and $d$, respectively. In this manner, relays 8ACS2, 8BCS2 and 8DCS2 in the storage means 8S2 will be energized eventually to call for the eventual normal positioning of the track switches $8w$, $3w$ and $2w$, respectively.

The transfer relay 8TN2 is energized by a pick-up circuit including front contact 49 of relay PBP, and back contacts 50–54 of relays 8DCS2, 8CCS2, 8BCS2, 8ACS2 and 8SD2, respectively, the various back contacts in the pick-up circuit acting to prevent the energization of relay 8TN2 whenever a description is already stored by the unit 8S2. Relay 8TN2 is then held energized by a stick circuit including its front contact 55, wire 55$a$ and front contact 56 of relay 1PBR in parallel with contact 57 of the push button 1PB. This stick circuit is effective as long as relay 1PBR is energized or as long as push button 1PB is held depressed.

At this point contacts 58, 59 and 60 of relay 8TN2 close the previously described energizing busses for relays 8ACS2, 8BCS2 and 8DCS2, respectively. At the same time the storage detection relay 8SD2 is energized by a pick-up circuit including front contact 61 of relay 8TN2, back contact 62 of relay 8CN2 and back contact 63 of relay CN. The energization of relay 8SD2 indicates that a route description is stored in the storage unit 8S2; and this storage is indicated by the energization of the indicator lamp 8SK2 through front contact 64 of relay 8SD2. Relay 8SD2 is then held by a stick circuit including front contact 65 of relay 8SD2, wire 66, back contact 67 of relay 8TN1, wire 68, and front contact 69 of relay 8SD2. Stick energy is also applied by back contact 70 of relay 8SD1 in combination with wire 68 and front contact 69 of relay 8SD2. Front contact 71 of relay 8SD2 provides stick energy for relays 8ACS2, 8BCS2 and 8DCS2 through their respective stick contacts 72, 73 and 74.

At this time, back contacts 27 and 28 of relay 8TN2 and 8SD2, respectively, have opened in the energizing circuit for relay PBP. The subsequent deenergization of relay PBP results in the opening of its front contacts 30 and 49 in the previously described respective energizing circuits for relays 1PBR and 8TN2. The deenergization of these relays indicates that the route description for a cut of cars has passed from the storage unit 8S3 into the storage unit 8S2; and the unit 8S3 is now able to receive another route description. In other words, the closing of back contacts 21 and 22 of relay 8TN2 and PBP, respectively, reestablishes the previously described pick-up circuit for relays 1–12PBR.

If at this time the storage unit 8S1 is vacant the description stored in the storage unit 8S2 can be transferred. The transfer is accomplished through the energization of relay 8TN1 by a pick-up circuit including back contact 76 of relay 8TN2, a parallel connection of front contacts 77, 78, 79 and 80 of relays 8SD2, 8ACS2, and 8DCS2, respectively, wire 81 of back contacts 82, 83, 84, 85 and 86 of relays 8DCS1, 8CCS1, 8BCS1, 8ACS1 and 8SD1, respectively. Front contact 87 of relay 8TN1 then closes to establish a stick circuit. It can be seen that relay 8TN1 cannot be energized if the storage detection relay 8SD1 or any of the code storage relays CS associated with the storage unit 8S1 are energized. Furthermore, the continued energization of relay 8TN1 is dependent upon the energization of the storage detection relay 8SD2 or any of the code storage relays associated with the storage group 8S2.

Relays 8SD1, 8ACS1, 8BCS1 and 8DCS1 can now be energized in response to the picking up of relay 8TN1 for a route description associated with track 1. Relay 8ACS1, for example, is energized by a pick-up circuit including front contact 88 of relay 8ACS2, wire 88$a$ and front contact 89 of relay 8TN1. Relay 8SD1 is energized concurrently by a pick-up circuit including front contact 65 of relay 8SD2, wire 66, front contact 67 of relay 8TN1, winding of relay 8SD1, back contact 90 of the cancellation relay 8CN1, back contact 91 of relay CN and contact 92 of the lever 8SML, lever contact 92 being of the previously described type which opens whenever the lever is pulled. The energization of relay 8SD1 results in the establishing of a stick circuit for any of the code storage relays 8ACS1, 8BCS1, 8CCS1 and 8DCS1 which may be energized. For example, relay 8ACS1 can be held energized by a stick circuit including front contact 93 of relay 8SD1 and front contact 94 of relay 8ACS1; and front contact 93 of relay 8SD1 acts in conjunction with front contacts 95 and 96 of relays 8BCS1 and 8DCS1, respectively, in a similar manner.

The storage detection relay 8SD1 is held energized by a stick circuit extending from (+) including back contact 97 of relay 10–12TN2, back contact 98 of relay 3–5TN2, wire 99, front contact 100 of the track relay 8TR, front contact 101 of relay 8SD1, the winding of relay 8SD1, back contact 90 of relay 8CN1, back contact 91 of relay CN and contact 92 of lever 8SML to (−). This stick circuit remains effective until the route description is transferred to a switch associated with switch location B in response to the occupancy of the detector track section associated with switch 8W by the cut of cars.

When relay 8SD1 becomes energized as described, its back contact 70 opens one of the previously described stick circuits for relay 8SD2, the other of the described stick circuits for relay 8SD2 being open at back contact 67 of relay 8TN1. Relay 8SD2 releases its armature and opens its front contact 71 in the previously described stick circuits for relays 8ACS2, 8BCS2 and 8DCS2. Thus, the transferring of the route description into the storage bank 8S1 results in the deenergization of the relays included in the storage bank 8S2. The transfer is complete when relay 8TN1 becomes deenergized by the opening of contacts 77, 78, 79 and 80 of relays 8SD2, 8ACS2, 8CCS2 and 8DCS2, respectively. The subsequent closing of back contact 67 of relay 8TN1 closes one of the stick circuits for relay 8SD2, thereby permitting the storing of a subsequent route description which can be introduced into storage unit 8S2 in the manner previously described. It can be noted that relay 8SD2 is assumed to be slow-acting in releasing its armature. The slow-release characteristic of the relay provides time intervals during which route descriptions can be transferred from the CS relays in storage unit 8S2 to comparable relays associated with the storage bank 8S1. In other words, additional time is provided wherein the pick-up circuits for relays in the storage unit 8S1 are energized by contacts of relays in the unit 8S2, thereby ensuring the transfer of route descriptions between the storage units.

When a route description is stored by the storage means 8S1 the indicator lamp 8SK1 is energized by the closing of a front contact 102 of the storage detection relay 8SD1.

*Operation of switch 8W*

The track switch 8W is assumed to be controlled by a switch machine similar to that described in the U.S. patent of C. W. Prescott, No. 1,854,602, dated April 19, 1932. The switch machine 8SM comprises an armature A, a field structure F, and various stationary and movable contact bars, the movable contact bars being operated in response to the movements of the armature A and associated gearing. In Fig. 6 movable contact bars 104, 105 and 106 are shown in the positions which they assume when the switch machine 8SM has been operated to its normal position. The contact bars 104 and 105 function to pole change the armature-field circuits so that the direction of rotation of the armature can be changed. The contact bar 106 is assumed to be utilized in indicating the operated positions of the switch machine 8SM.

In order to permit the trailing of the track switch 8W the switch machine 8SM is constructed, as described in the Prescott patent, so that trailing movements do not affect the positions of the various movable contact bars. In other words, the movable contact bars indicate only motor-operated positions.

Since it is desirable to detect the positions of the switch points of track switch 8W a point detector mechanism 8PD is shown in Fig. 6. The point detector 8PD can be of any of a number of well known types and is assumed to include fingers 107 and 108 which are actuated by rods connecting the point detector 8PD to the switch points. Contact 107 is assumed to be closed only when the track switch 8W lies in its full normal position, while contact 108 is closed only when the switch lies in its full reverse position.

The switch machine 8SM is controlled directly by two switch control relays 8NW and 8RW in a manner similar to that described in the U.S. patent of Brixner et al., No. 2,700,728 dated January 25, 1955. More specific descriptions of both switch machine and switch control relay operations in conjunction with the present invention can now be described in greater detail.

As previously described the code storage relay 8ACS1 is provided in the storage unit 8S1 for determining the controlled positions of the track switch 8W. When relay 8ACS1 is energized the track switch 8W is called to its normal position; and switch 8W is called to its reverse position when relay 8ACS1 is deenergized. Relay 8ACS1 is effective in positioning switch 8W only when the storage detection relay 8SD1 is energized, indicating the presence of a route description in the storage unit 8S1.

Whenever a route description is stored in the storage unit 8S1, one or the other of the switch repeater relays 8NWP and 8RWP is energized to indicate the position of the track switch 8W. When switch 8W lies in its normal position relay 8NWP is energized by a pick-up circuit extending from (−), including front contact 110 of relay 8ACS1, front contact 111 of relay 8SD1, back contact 112 of relay 3–5TN2, the winding of relay 8NWP, contact 107 of the point detector 8PD, and the contact bar 106 of the switch machine 8SM, to (+). Similarly, when switch 8W lies in its reverse position, relay 8RWP is energized by a pick-up circuit including back contact 110 of relay 8ACS1, front contact 113 of relay 8SD1, back contact 114 of relay 10–12TN2, the winding of relay 8RWP, contact 108 of the point detector 8PD, and the contact bar 106 of the switch machine 8SM. It is evident that the energization of either of the switch repeater relays is dependent upon the called position of the switch as indicated by relay 8ACS1, the operated position of the switch machine motor as indicated by the contact bar 106 and the actual position of the switch points as indicated by contacts 107 and 108 of the point detector 8PD. Once energized, relays 8NWP and 8RWP are held energized by stick circuits including their respective contacts 115 and 116 in conjunction with front contact 117 of relay 8SD1. In other words, either switch repeater relay is held energized as long as a route description is stored in the storage unit 8S1.

The switch repeater relays 8NWP and 8RWP are all also operable in response to manual controls set up for the switch machine 8SM. As previously described, the switch machine lever 8SML permits automatic operations when positioned in its left-hand position. When positioned in its center or right-hand positions the lever 8SML directly controls the normal or reverse positions of the track switch 8W. Under manual operating conditions contacts 118 and 119 of the lever 8SML are closed to permit the energization of whichever of the switch repeater relays can be energized in accordance with the position of the track switch 8W. More specifically, relay 8NWP can be energized by a pick-up circuit including contact 118 of the lever 8SML, back contact 111 of relay 8SD1, back contact 112 of relay 3–5TN2, the winding of relay 8NWP, contact 107 of the point detector 8PD, and the contact bar 106 of the switch machine 8SM. Similarly, relay 8RWP can be energized by a pick-up circuit including contact 118 of the lever 8SML, back contact 113 of relay 8SD1, back contact 114 of relay 10–12TN2, the winding of relay 8RWP, contact 108 of the point detector 8PD, and the contact bar 106 of the switch machine 8SM.

Whenever a route description is stored by the storage unit 8S1 a subsequent positioning of the lever 8SML to one of its manual positions can cause the switch machine 8SM to be operated to a position contrary to the position called for by the route description. Under these circumstances the appropriate switch repeater relay should be energized. Contact 119 of lever 8SML is provided to permit the energization of either relay NWP or RWP under such conditions. Assume, for example, that a route description causes the operation of the track switch 8W to its normal position. Relays 8SD1 and 8ACS1 are energized, and relay 8NWP is energized as previously described by the pick-up circuit including front contacts 110 and 111 of relays 8ACS1 and 8SD1, respectively. A subsequent positioning of lever 8SML in its reverse call (center) position causes the switch machine 8SM to operate switch 8W to its reverse position in a manner to be described later. Relay 8NWP is deenergized by the movement of the contact bar 106 in switch machine 8SM and by the contact 107 of the point detector 8PD; and contacts 106 and 107 then move to positions which permit the energization of relay 8RWP. It is evident that relay 8RWP cannot be energized either by the pick-up circuit including contact 118 of lever 8SML and back contact 111 of relay 8SD1 or by the pick-up circuit including back contact 110 of relay 8ACS1 and front contact 113 of relay 8SD1. Therefore, contact 119 of lever 8SML acts to permit the energization of relay 8RWP by a circuit including front contacts 110 and 113 of relays 8ACS1 and 8SD1, respectively. Similarly, when lever 8SML calls for the normal position of switch 8W at a time when a route description has caused the reverse positioning of switch 8W, contact 119 of lever 8SML in conjunction with back contact 110 of relay 8ACS1 and front contact 111 of relay 8SD1 closes a pick-up circuit for relay 8NWP, relay 8ACS1 being deenergized for reverse position calls for switch 8W. Thus, contact 119 of lever 8SML acts, when closed, to permit the energization of one or the other of the switch repeater relays 8NWP and 8RWP irrespective of the position in which contact 110 of relay 8ACS1 is closed. Whenever lever 8SML is placed in either the center or right-hand position prior to the storage of a route description in the storage unit 8S1, contact 118 of lever 8SML and back contacts 111 and 112 of relay 8SD1 are initially effective, as described, in energizing either relay 8NWP or 8RWP. The energization of relay 8SD1 causes back contacts 111 and 113 to open and front contacts 111 and 113 to close, thereby rendering relay 8NWP or 8RWP dependent upon the energizing circuit including contact 119 of lever 8SML. Since it is desirable to prevent relays 8NWP and 8RWP from releasing their armatures whenever a route description becomes stored while the lever 8SML is in a manual operating position, relays 8NWP and 8RWP are made slow-acting in releasing their armatures and are capable of bridging momentary openings of their respective energizing circuits by the crossing over of contacts 111 and 113 of relay 8SD1.

The switch machine 8SM is controlled under automatic operation in accordance with the route called for by the code storage relay 8ACS1. In order to call for the switch machine 8SM to be operated to its normal position relay 8NW must be energized. Relay 8NW is energized by a pick-up circuit extending from (+), including front contact 121 of relay 8TR, contact 122 of lever 8SML in its left-hand position, front contact 123 of relay 8SD1, front contact 124 of relay 8ACS1, front contact 125 of the timing relay 8WPP, back contact 126 of relay 8RW, and the lower winding of relay 8NW, to (−). Relay 8NW is then held energized by a stick circuit including back contact 127 of relay 8NWP, front contact 128 of relay 8WPP, and front contact 129 of relay 8NW. The purpose of this stick circuit will become evident as the description progresses.

When a reverse route call is made relay 8RW is energized by a pick-up circuit including front contact 121 of relay 8TR, contact 122 of lever 8SML, front contact 123 of relay 8SD1, back contact 124 of relay 8ACS1, front contact 130 of relay 8WPP, back contact 131 of relay 8NW, and the lower winding of relay 8RW. A stick circuit is then closed for relay 8RW, this stick circuit including back contact 132 of relay 8RWP, front contact 133 of relay 8WPP, and front contact 134 of relay 8RW.

Assume that as shown in Fig. 6 the switch machine 8SM is in its normal operating position. Further assume that a route description calling for the reverse position of the track switch 8W is stored in the storage unit 8S1, relay 8RW becoming energized by the previously described pick-up circuit. Front contact 135 of relay 8RW closes to apply (+) energy to the motor circuit of the switch machine 8SM; and this circuit can be traced through the contact bar 105 of switch machine 8SM, the armature A of the switch machine, contact bar 104 of the switch machine, the field F, back contact 136 of relay 8NW, the upper winding of relay 8RW, and front contact 137 of relay 8RW, to (−). The energization of the armature and field windings of the switch machine is accomplished in series with the upper winding of relay 8RW. This winding is assumed to have low resistance and is capable of holding the relay armature in its attracted position when magnetic flux caused by current in the switch machine armature-field circuit reaches a predetermined magnitude. In this manner, the switch control relay 8RW continues to close an energizing circuit for the switch machine motor until the motor completes its operation; and the completion of the motor operation is detected by the contact bars 104 and 105 which move to their upper positions. It is evident from the previously described operations of the switch repeater relays 8NWP and 8RWP that when the switch machine 8SM moves to its reverse position the contact bar 106 is effective in energizing relay 8RWP. However, should an obstruction prevent the switch points from obtaining the full reverse position, the pick-up circuit for relay 8RWP is open at contact 108 of the point detector 8PD.

Whenever the switch machine 8SM has been operated to its reverse position and a subsequent route description calls for the switch machine to be operated to its normal position, relay 8NW is energized by the previously described pick-up circuit. The field and armature of the switch machine 8SM are then energized by a circuit including front contact 138 of relay 8NW, contact bars 104 and 105 of switch machine 8SM in their upper positions, back contact 139 of relay 8RW, the upper winding of relay 8NW, and front contact 140 of relay 8NW. The upper winding of relay 8NW functions in the same manner as that described for relay 8RW.

Relay 8NWP can now be operated in response to the positioning of contact bar 106 of relay 8SM, provided that the switch points of switch 8W move to the full normal position as indicated by the closing of contact 107 of the point detector 8PD.

The switch machine 8SM can be controlled to its reverse position by manual means whenever the switch machine lever 8SML is turned to its center position. The energizing circuit for the reverse switch control relay 8RW includes front contact 121 of relay 8TR, contact 122 of lever 8SML, back contact 142 of relay 8RWP, front contact 130 of relay 8WPP, and back contact 131 of relay 8NW. Similarly, when lever 8SML is moved to its right-hand position, relay 8NW is energized by a pick-up circuit including front contact 121 of relay 8TR, contact 122 of lever 8SML, back contact 141 of relay 8NWP, front contact 125 of relay 8WPP, and back contact 126 of relay 8RW. The energization of relay 8NW by the previously described circuit means causes the operation of the switch machine 8SM to its normal position.

The value of the previously described stick circuits for relays 8NW and 8RW can be described at this time with regard to manual controls set up for the switch machine 8SM. Assume that the switch machine 8SM is in its normal position at a time when the switch machine lever 8SML is moved from its automatic (left-hand) position to its right-hand position to call for a normal switch control. In performing this operation, contact 122 of lever 8SML passes through the center position which is associated with the energization of relay 8RW. Under these conditions, relay 8RW could be momentarily energized, closing its front contacts to energize the switch machine motor. As the contact 122 of lever 8SML leaves the center position, the pick-up circuit for relay 8RW is opened, and the magnetic flux produced in the upper winding by motor current may not have increased sufficiently to hold the armature of relay 8RW. Therefore, the various contacts of relay 8RW open and are caused to interrupt the heavy initial motor current. Since the resultant arcing across the contacts of relay 8RW can be detrimental, it is necessary to provide means for holding relay 8RW energized. The stick circuit including back contact 132 of relay 8RWP, front contact 133 of relay 8WPP and front contact 134 of relay 8RW maintins energization of relay 8RW until the switch machine is operated to its full reverse position, this condition being indicated by the opening of back contact 132 of relay 8RWP. Back contact 127 of relay 8NWP performs a similar function in the comparable stick circuit for relay 8NW.

The relay 8WPP is a timing relay provided to time normal operations of the switch machine 8SM. If the switch operating time is exceeded because of an obstruction blocking the switch points or for any other reason, relay 8WPP is caused to release its armature as will be described and reverses the energization of the switch control relays. For example, when a normal switch call is in effect, the releasing of the armature of relay 8WPP results in the opening of the pick-up circuit for relay 8NW at front contact 125 of relay 8WPP. The subsequent closing of back contact 125 of relay 8WPP energizes relay 8RW, thereby causing the operating of the switch machine to its reverse position. In the case of reverse switch calls which cannot be effected, contact 130 of relay 8WPP opens the pick-up circuit for relay 8RW and closes a pick-up circuit for relay 8NW. As previously described, relay 8NW has a stick circuit including back contact 127 of relay 8NWP and front contact 128 of relay 8WPP, while relay 8RW has a stick circuit including back contact 132 of relay 8RWP and front contact 133 of relay 8WPP. Thus, whenever relay 8WPP releases its armature these stick circuits for relays 8NW and 8RW are opened. More specifically, if relay 8NW, for example, were energized to operate switch machine 8SM from its reverse to its normal position, back contact 127 of relay 8NWP remains closed until the track switch 8W reaches its full normal position as indicated by contact 107 of the point detector 8PD. If switch 8W is unable to reach its full normal position back contact 127 of relay 8NWP remains closed, maintaining the stick circuit for relay 8NW. This stick circuit must therefore be opened to deenergize relay 8NW if the relay 8WPP is to be effective in energizing relay 8RW, since back contact 131 of relay 8NW is included in the pick-up circuit for relay 8RW; and contact 128 of relay 8WPP provides for the deenergization of relay 8NW under such conditions. Contact 133 of relay 8WPP acts in a similar manner in the stick circuit for relay 8RW.

Relay 8WPP is provided with two independent windings, each of which is capable when energized of picking up the relay armature. The use of two independent windings provides a means for electrically isolating various pick-up and stick circuits which will be described.

As previously stated, relay 8WPP must be slow-acting in releasing its armature to an extent determined by the operating time of the associated switch machine. Such slow-acting characteristics can be obtained in any number of well-known ways, such as the use of copper washers in conjunction with each winding-core structure.

Under normal conditions, relay 8WPP is energized by either one of two stick circuits. One stick circuit includes contact bar 106 of the switch machine 8SM, contact 107 of the point detector 8PD, back contact 143 of relay 8NWP, front contact 144 of relay 8WPP, front contact 145 of relay 8TR and the upper winding of relay 8WPP. The other stick circuit includes contact bar 106 of switch machine 8SM, contact 108 of the point detector 8PD, back contact 146 of relay 8RWP, front contact 147 of relay 8WPP, front contact 148 of relay 8TR, and the lower winding of relay 8WPP. Each stick circuit is obviously effective only when the associated switch repeater relay 8NWP or 8RWP is deenergized and positional correspondence exists between the switch machine mechanism and the point detector 8PD.

Each winding of relay 8WPP has a second stick circuit for energizing the relay when either of the switch repeater relays is energized. The upper winding of relay 8WPP can be energized through front contacts 143, 144 and 145 of relays 8NWP, 8WPP and 8TR, respectively, while the lower winding can be energized through front contacts 146, 147 and 148 of relays 8RWP, 8WPP and 8TR, respectively. Thus, whenever the detector track section 8T is unoccupied and either of the switch repeater relays 8NWP or 8RWP is energized, stick energy is available for relay 8WPP.

Relay 8WPP can be picked-up either by track occupancy or by operations of the lever 8SML. Whenever track section 8T is occupied back contact 148 of relay 8TR closes to energize the lower winding of relay 8WPP. Whenever the track section 8T is unoccupied, the upper winding of relay 8WPP can be energized through front contact 121 of relay 8TR, contact 122 of lever 8SML (closed to the right) and front contact 149 of relay 8NWP. Similarly, when contact 122 of lever 8SML is closed in the center position, the lower winding of relay 8WPP can be energized through front contact 150 of relay 8RWP. The various pick-up circuits for relay 8WPP are in accordance with general operational practices whereby the relay can be restored to an energized state by establishing correspondence between the actual and the called-for (by manual control) positions of the track switch; or the relay can be restored automatically by the passage of cars through the detector track section.

As previously stated in the descriptions of operations of the switch control circuits and the switch repeater relay circuits for track switch 8W, Fig. 6 represents conditions under which the track switch 8W has been operated to its normal position. The lever 8SML is in its automatic (left-hand) position, and no route description is stored by the storage unit 8S1. Under these conditions, the upper winding of relay 8WPP is energized by the stick circuit including contact 107 of the point detector 8PD and back contact 143 of relay 8NWP.

Assume now that a route description calling for the reverse position of switch 8W is introduced into the storage unit 8S1. The switch control circuits operate as previously described, resulting in the operation of switch machine 8SM. The contact bar 106 in switch machine 8SM moves from its lower position to open the stick circuit for the upper winding of relay 8WPP; and, as the switch points are moved, contact 107 of the point detector 8PD also opens in the stick circuit for relay 8WPP. The subsequent arrival of the contact bar 106 in its upper position and the closing of contact 108 of the point detector 8PD close the pick-up circuit described for relay 8RWP and, at the same time, close the stick circuit for the lower winding of relay 8WPP. Contact 146 of relay 8RWP immediately crosses over from its back to its front position, rendering the lower winding of relay 8WPP subject to energization through front contacts 147 and 148 of relays 8WPP and 8TR, respectively.

During the switch positioning operation described, relay 8WPP retained its armature because of the slow-release characteristics of the relay. If, for any reason, the switch positioning operation were incomplete no energy could reach either relay 8RWP or the lower winding of relay 8WPP through contact 108 of the point detector 8PD. Relay 8WPP would then be caused to release its armature after a time and cause the reversal of switch machine operation, as previously described, returning the switch machine and the track switch to the normal position. Since contacts 144 and 147 of relay 8WPP open, the stick circuits for the relay are ineffective. Therefore, relay 8WPP cannot be restored to a normally energized state until one of the pick-up circuits is closed either by lever 8SML operation or by track occupancy.

Assuming that the operation of switch 8W from its normal to its reverse position is completed, relay 8WPP retains its armature. When the cut of cars associated with the stored route description occupies the track section 8T, front contact 148 of relay 8TR opens the stick circuit for the lower winding of relay 8WPP; but the subsequent closing of back contact 148 of relay 8TR energizes the lower winding of relay 8WPP. As will be described, the occupancy of the track section 8T causes the transfer of the route description from the storage unit 8S1; and if the description cannot be transferred it is cancelled when the track section is vacated. In either case, relay 8RWP is deenergized by the opening of front contacts 113 and 117 of relay 8SD1, an operation to be described. Thus, when the track section 8T is vacated back contact 148 of relay 8TR removes pick-up energy from relay 8WPP; but back contact 146 of relay 8RWP closes a stick circuit for relay 8WPP.

Similar operations of the switch machine 8SM and the track switch 8W from the reverse to the normal position result in similar operations of the pick-up and stick circuits for relay 8WPP, relay 8WPP being ultimately held energized through back contact 143 of relay 8NWP.

Assume now that switch 8W is operated from its normal to its reverse position by manual control rather than by automatic control. The lever 8SML is moved to its center position causing the switch machine 8SM to operate as previously described, and causing relay 8RWP to be energized when the switch reaches its reverse position. The stick circuits for relay 8WPP are operated in the same manner as described previously. Energy is also applied to the lower winding of relay 8WPP through contact 122 of lever 8SML and front contact 150 of relay 8RWP. Subsequent track occupancy causes the opening of the energizing circuits for relay 8WPP at front contacts 121 and 148 of relay 8TR; but back contact 148 of relay 8TR closes to energize the lower winding of relay 8WPP. Since, as described, relay 8RWP is held energized during such operations, the subsequent vacating of the track section 8T causes the reclosing of the energizing circuits for relay 8WPP at front contacts 121 and 148 of relay 8TR. Thus, only a failure of switch 8W to complete its operation to the reverse position could cause relay 8WPP to release its armature, since such a failure would result in the open condition of the pick-up circuit for relay 8RWP and the corresponding stick circuit for relay 8WPP at contact 108 of the point detector 8PD.

Similar circuit operations occur whenever switch 8W is controlled by manual rather than automatic means to operate from its reverse to its normal position, relay 8NWP being energized during such operations.

In view of the preceding descriptions of circuit operation affecting relay 8WPP, it is evident that relay 8WPP is always provided with an effective pick-up or stick circuit in time to prevent the releasing of the relay armature, except when the track switch 8W is unable to reach a fully operated position. It can also be noted that the arrangement of contacts of relays 8TR, 8NWP and 8RWP in the various energizing circuits for relay 8WPP is such that energy run-arounds are prevented, thereby precluding the possibility of energizing either of the switch repeater relays by means other than those described.

Whenever switch 8W is trailed by a car or engine the point detector 8PD responds to the movement of the switch points. The switch machine 8SM does not respond accordingly, however, so that the contact bars in the switch machine are not moved. The resultant lack of correspondence between the switch machine mechanism and the point detector 8PD opens the stick circuits for relay 8WPP which include back contacts 143 and 146, respectively, of relays 8NWP and 8RWP. Since such lack of positional correspondence also prevents the energization of either relay 8NWP or 8RWP, relay 8WPP cannot be energized by any circuit which includes front contacts of either switch repeater relay. During trailing moves, however, the detector track section 8T is occupied before and during trailing operations. Thus, relay 8WPP is energized by back contact 148 of relay 8TR during track occupancy. Therefore, when a car making a trailing move enters the detector track section 8T, relay 8WPP is energized directly as the result of track occupancy. The subsequent trailing of the switch points opens the energizing circuits for relays 8NWP and 8RWP and the described stick circuits for relay 8WPP. When the track section is then vacated, back contact 148 of relay 8TR removes energy from relay 8WPP. Relay 8WPP is thereby deenergized causing the actuation of indication means to be described, thereby indicating to the yard operator that switch 8W has been trailed. The operator can then restore energization of relay 8WPP by operating lever 8SML, and can thereby correct conditions which would lead to incorrect routing of cuts or possible derailments.

The indication lights 8NK and 8RK which indicate switch position on the control panel P2 are energized by circuits shown in Fig. 6. The normal indication light 8NK is energized whenever relays 8NWP is energized to close its front contact 155, while the reverse indication light 8RK is energized when relay 8RWP is energized to close its front contact 156. Thus, the energization of the respective indication lamps is dependent upon the energization of the associated switch repeater relay, whereby an indication lamp is energized either whenever a route description is stored in the storage unit 8S1 or whenever a manual control of the switch 8W is effected.

The indication light 8TK which is provided in the barrel of the switch control lever 8SML indicates track occupancy. The lamp 8TK is illuminated by an energizing circuit including back contact 157 of relay 8TR and front contact 158 of relay 8WPP. Whenever the switch 8W is obstructed or trailed, relay 8WPP is deenergized resulting in the opening of front contact 158 of relay 8WPP in the energizing circuit for the lamp 8TK. The subsequent closing of back contact 158 of relay 8WPP applies flashing energy (F+) to the lamp 8TK, thereby indicating to the operator that manual operations are required to restore the switch control circuits to normal. The flashing indication, however, primarily serves to indicate that a cut of cars will be routed incorrectly unless manual operations are effected in an attempt to remove the obstruction. Audible indication under these conditions is provided by a bell or buzzer 8BX which is energized by the closing of back contact 159 of relay 8WPP.

*Transfer of route descriptions*

When a route description is stored in the storage unit 8S1, an occupancy of the detector track section associated with switch 8W results in the transferring of the route description to either storage unit 3–5S2 or 10–12S2, depending on the position of track switch 8W called for by the route description. The transfer of a route description to either of the storage units 3–5S2 or 10–12S2 is accomplished by energizing transfer relays 3–5TN2 and 10–12TN2. These transfer relays can be considered as being associated with the respective storage units 3–5S2 and 10–12S2, or they can be considered as being associated with routes over the respective normal and reverse positions of track switch 8W.

When the track circuit is shunted, relay 3–5TN2 or relay 10–12TN2 becomes energized in response to the closing of back contact 160 of relay 8TR. A pick-up circuit for relay 3–5TN2 can be traced from (+) including back contact 160 of relay 8TR, front contact 161 of relay 8SD1, front contact 162 of relay 8ACS1, front contact 163 of relay 8NWP, wire 164, front contact 165 of relay 10–12TN2, back contact 167 of relay 3–5DCS2, back contact 168 of relay 3–5CCS2, back contact 169 of relay 3–5BCS2, back contact 170 of relay 3–5SD2 and the upper winding of relay 3–5TN2, to (−). It is evident that this pick-up circuit is effective only when the route description calls for a route to track switch 3W and switch 8W lies in its normal position, and furthermore, the storage relays associated with the storage unit 3–5S2 must be deenergized. The pick-up circuit is also dependent on front contact 165 of relay 10–12TN2, this relay being normally associated with description transfers to the storage unit 10–12S2. However, under transfer conditions in the present invention, relay 10–12TN2 becomes energized by a pick-up circuit including back contact 160 of relay 8TR, front contact 161 of relay 8SD1, front contact 162 of relay 8ACS1, and the wire 166.

Similarly, relay 10–12TN2 can be energized by a pick-up circuit including back contact 160 of relay 8TR, front contact 161 of relay 8SD1, back contact 162 of relay 8ACS1, front contact 175 of relay 8WRP, wire 176, front contact 177 of relay 3–5TN2, back contact 179 of relay 10–12DCS2, back contact 180 of relay 10–12CCS2, back contact 181 of relay 10–12BCS2, back contact 182 of relay 10–12SD2, and the upper winding of relay 10–12TN2. Relay 10–12TN2 is therefore dependent upon the energization of relay 3–5TN2. A pick-up circuit for relay 3–5TN2 under such conditions is provided by the wire 178 which extends from the heel of contact 175 of relay 8RWP to the upper winding of relay 3–5TN2.

It is evident then that in transferring a route description the transfer relay associated with the route not called for is energized by substantially direct circuit means; and this relay must be energized before the transfer relay associated with the route called for can be energized by circuit means which check both route correspondence and storage vacancy.

Once energized, relay 3–5TN2 is held energized by a stick circuit including back contact 171 of relay 8TR, wire 172, and front contact 173 of relay 3–5TN2. Similarly, relay 10–12TN2 has a stick circuit including back contact 171 of relay 8TR, wire 172, and front contact 174 of relay 10–12TN2. Thus, both transfer relays are held energized as long as a car or cut of cars associated with a description being transferred occupies the track section for switch 8W.

An alternate stick circuit for relay 3–STN2 includes front contact 183 of relay 8SD1, wire 184, front contact 185 of relay 3–5TN2, and back contact 186 of relay 10–12TN2. A similar stick circuit including front contact 183 of relay 8SD1, wire 184, back contact 187 of relay 3–5TN2 and front contact 188 of relay 10–12TN2 is provided for relay 10–12TN2. It is evident that the alternate stick circuit for either transfer relay is effective only when the other of the two relays is deenergized. In other words, if a route description calls for the energization of relay 3–5TN2, relay 10–12TN2 is energized by the described direct pick-up circuit means; and if relay 3–5TN2 cannot be energized for any reason, the alternate stick circuit for relay 10–12TN2 is held effective by the closed condition of back contact 187 of relay 3–5TN2. Similarly, the alternate stick circuit for relay 3–5TN2 is effective as long as back contact 186 of relay 10–12TN2 is closed; and this condition applies whenever a route description calls for the energization of relay 10–12TN2 to permit the transfer of a route description to the storage unit 10–12S2. The function of the various stick circuits will be described in greater detail.

Assuming that a route is set up for classification track 1, relay 3–5TN2 becomes energized when the associated cut of cars shunts the track circuit associated with switch 8W, relay 10–12TN2 having been previously energized by direct pick-up circuit means. At this point, the storage detection relay 3–5SD2 is energized by a pick-up circuit extending from (+), including front contact 97 of relay 10–12TN2, front contact 189 of relay 3–5TN2, wire 190, front contact 191 of relay 8NWP, wire 192, the winding of relay 3–5SD2, and back contact 193 of relay CN, to (−). Had the route description called for a track destination which required the actuation of switch 10W rather than switch 3W, the description being transferred would result in the energization of relay 10–12SD2. Front contacts 97 and 189 respectively of relays 10–12TN2 and 3–5TN2, respectively, would then energize relay 10–12SD2, provided that switch 8W assumed its reverse position, through front contact 194 of relay 8RWP and wire 195.

Relay 3–5SD2 is held energized by either of two stick circuits, one including front contact 196 of relay 3–5SD2, back contact 197 of relay 3–5TN1, and front contact 198 of relay 3–5SD2, the other stick circuit including back contact 199 of relay 3–5SD1 and front contact 198 of relay 3–5SD2. It is assumed that a similar stick circuit is provided for relay 10–12SD2, although such a stick circuit is not shown in the drawings.

The energization of the transfer relays 3–5TN2 and 10–12TN2 also results in the energization of selected code storage relays associated with either storage unit 3–5S2 or 10–12S2. In the case of a route description which selects track 1 as a destination, relays 3–5BCS2 and 3–5DCS2 must be energized in accordance with the code chart of Fig. 4. Relay 3–5BCS2 is energized by a pick-up circuit including front contact 200 of relay 8BCS1, front contact 201 of relay 8NWP, wire 202, front contact 203 of relay 3–5TN2, front contact 204 of relay 10–12TN2, and the winding of relay 3–5BCS2. A similar pick-up circuit for relay 3–5DCS2 includes front contact 205 of relay 8DCS1, front contact 206 of relay 8NWP, wire 207, front contact 208 of relay 3–5TN2, front contact 209 of relay 10–12TN2, and the winding of relay 3–5DCS2. Contact 210 of relay 3–5SD2 provides stick energy for relays 3–5BCS2 and 3–5DCS2 through their respective stick contacts 211 and 212.

At the time when the detector track section associated with switch 8W is shunted, front contact 100 of relay 8TR in the previously described stick circuit for relay 8SD1 opens. An alternate stick circuit is then established by the subsequent closing of back contact 100 of relay 8TR. Under conditions wherein the route call for switch 8W is normal, the stick circuit for relay 8SD1 includes front contact 213 of relay 8ACS1, wire 214, back contact 215 of relay 3–5TN2 wire 216 and back contact 100 of relay 8TR. In view of the preceding description of transfer operations, it can be seen that this stick circuit is opened when back contact 215 of relay 3–5TN2 opens. Therefore, a complete transfer results in the deenergization of relay 8SD1, thereby indicating the transfer of a route description. Relay 8SD1, being slow-acting, provides time for relays associated with the storage unit 3–5S2 to be energized in accordance with the selective energization of the code storage relays of the storage unit 8S1. Relay 8SD1, in releasing its armature, opens the stick circuits for the code storage CS relays in the unit 8S1. At this point, the transfer of the route description from storage unit 8S1 to storage unit 3–5S2 is complete; and the storage unit 8S1 is able to receive and store a subsequent route description. Should a route description be transferred to the storage unit 10–12S2 instead of 3–5S2, an alternate stick circuit for relay 8SD1 including back contact 213 of relay 8ACS1, wire 217, back contact 218 of relay 10–12TN2, wire 216, and back contact 100 of relay 8TR is provided.

Assuming that a subsequent description is transferred into the storage unit 8S1 while the associated detector track section remains occupied, it is necessary to provide an alternate stick circuit for relay 8SD1. Since, as previously described, the switch repeater relays 8NWP and 8RWP are deenergized as soon as relay 8SD1 is deenergized, a stick circuit means including back contacts 220 and 221 of relays 8RWP and 8NWP, respectively, is provided for relay 8SD1. When the track circuit is vacated track relay 8TR is energized opening the stick circuit for relay 8SD1 at back contact 100 and at the same time opens the stick circuits for relays 3–5TN2 and 10–12TN2 at back contact 171. The release time of relay 8SD1, however, is great enough to bridge the operations of relay 8TR and the transfer relays 3–5TN2 and 10–12TN2. Therefore, relay 8SD1 is reenergized, before releasing its armature, by the previously described stick circuit including back contacts 97 and 98 of relays 10–12TN2 and 3–5TN2, respectively, and front contact 100 of relay 8TR.

It can be noted that under conditions wherein a transfer cannot be effected, the alternate stick circuit for relay 8SD1 remains effective throughout the occupancy of the associated detector track section. In other words, if relay 3–5TN2 cannot be energized because of a previous description in the storage unit 3–5S2 or because, of a failure in switch operation, the stick circuit including front contact 213 of relay 8ACS1 and back contact 215 of relay 3–5TN2 remains closed. Under such conditions, it is necessary to cancel the description stored in the storage unit 8S1 after the associated cut of cars leaves the detector track section. When the cut of cars leaves the track section, returning relay 8SD1 to its stick circuit which includes back contacts 97 and 98 of relays 10–12TN2 and 3–5TN2, respectively, it is essential that this circuit remain open. This is accomplished by the previously described alternate stick circuit for relays 3–5TN2 and 10–12TN2 which is effective only under faulty transfer conditions. More specifically, should relay 3–5TN2 fail to be energized, relay 10–12TN2 which is energized by direct pick-up circuit means is held energized by the stick circuit including front contact 183 of relay 8SD1, wire 184, back contact 187 of relay 3–5TN2 and front contact 188 of relay 10–12TN2. Therefore, relay 10–12TN2 remains energized until relay 8SD1 releases its armature; and relay 8SD1 is formed to release its armature by the open condition of back contact 97 of relay 10–12TN2 in the previously described stick circuit.

Whenever a route description is introduced into the storage unit 8S1 at a time when a cut of cars associated with a previously transferred route description occupies the detector track section, the later description cannot be permitted to be transferred also. In other words, only one route description can be transferred by a cut of cars. Assume that a cut of cars occupies the detector track section at switch 8W and has caused the transfer of a route description to the storage unit 3–5S2. Relays 3–5TN2 and 10–12TN2 are both held energized because of track occupancy and relay 8SD1 is deenergized, resulting in the deenergization of relay 8NWP. Assume that a second route description is transferred into the storage unit 8S1 and is held by the energization of relay 8SD1 which is, in turn, held by its stick circuit including back contacts 220 and 221 of relays 8RWP and 8NWP, respectively. The second description can be transferred only when relay 8NWP or 8RWP becomes energized, since front contacts of these switch repeater relays are included in the previously described pick-up circuits for relays 3–5SD2 or 10–12SD2 and the associated code storage CS relays in the storage units 3–4S2 and 10–12S2. Relays 8NWP and 8RWP cannot be energized, however, because back contacts 112 and 114 of relays 3–5TN2 and 10–12TN2 (see Fig. 6), respectively, are open in the respective pick-up circuits for the two switch repeater relays. Therefore, the cut of cars must leave the detector track section and deenergize the transfer relays before either switch repeater relay can be reenergized.

Figure 5A:
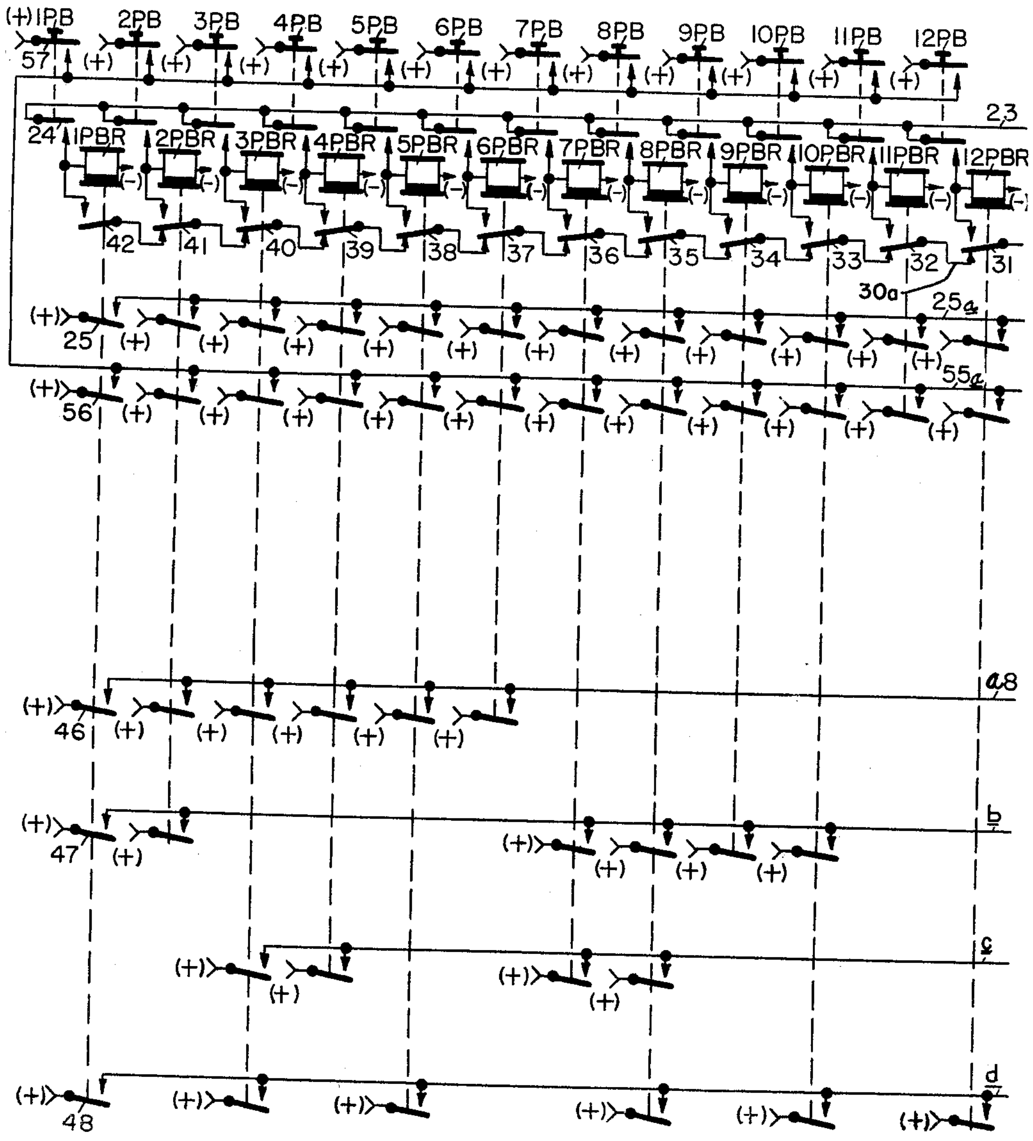
Figure 5B:
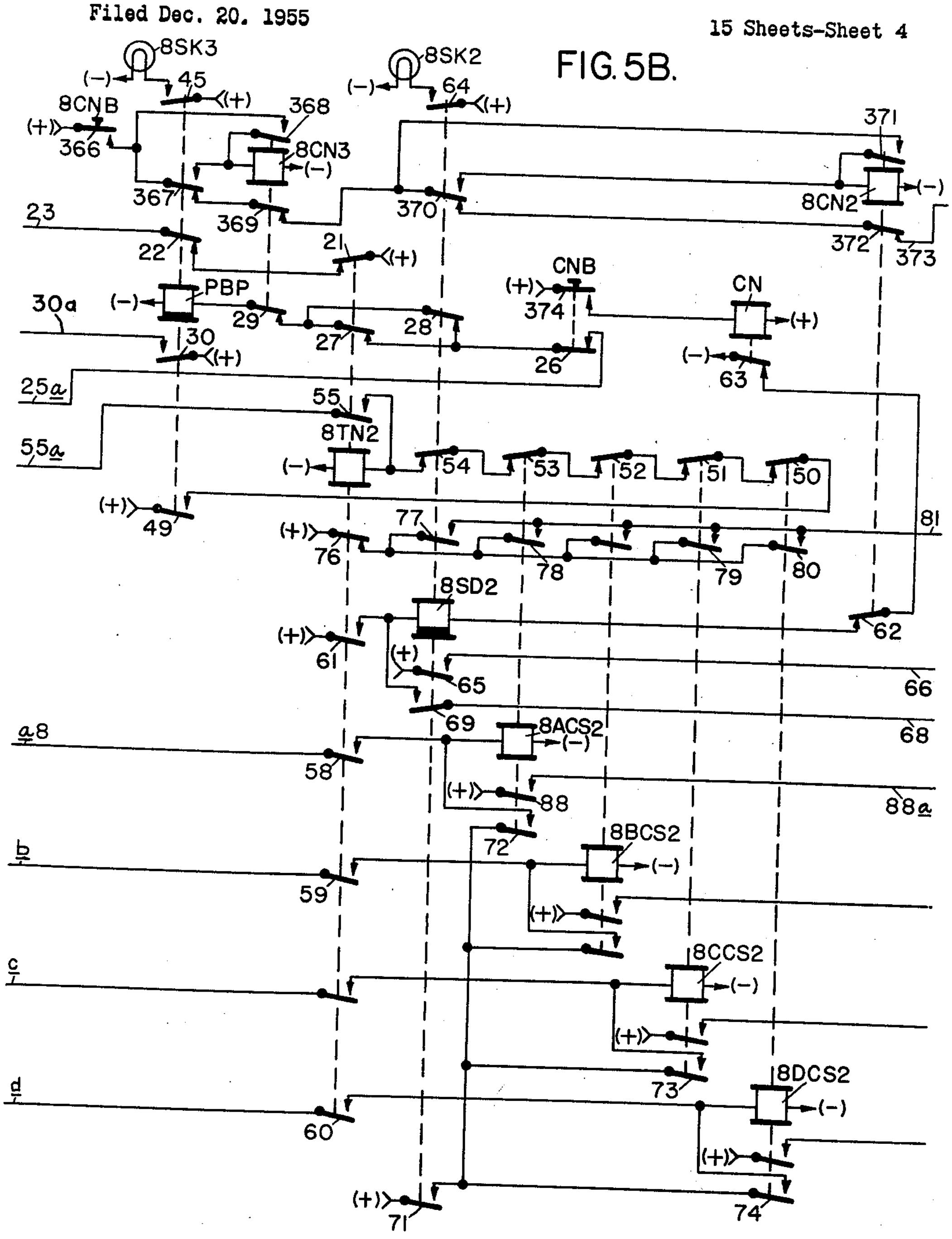
Figure 5C:
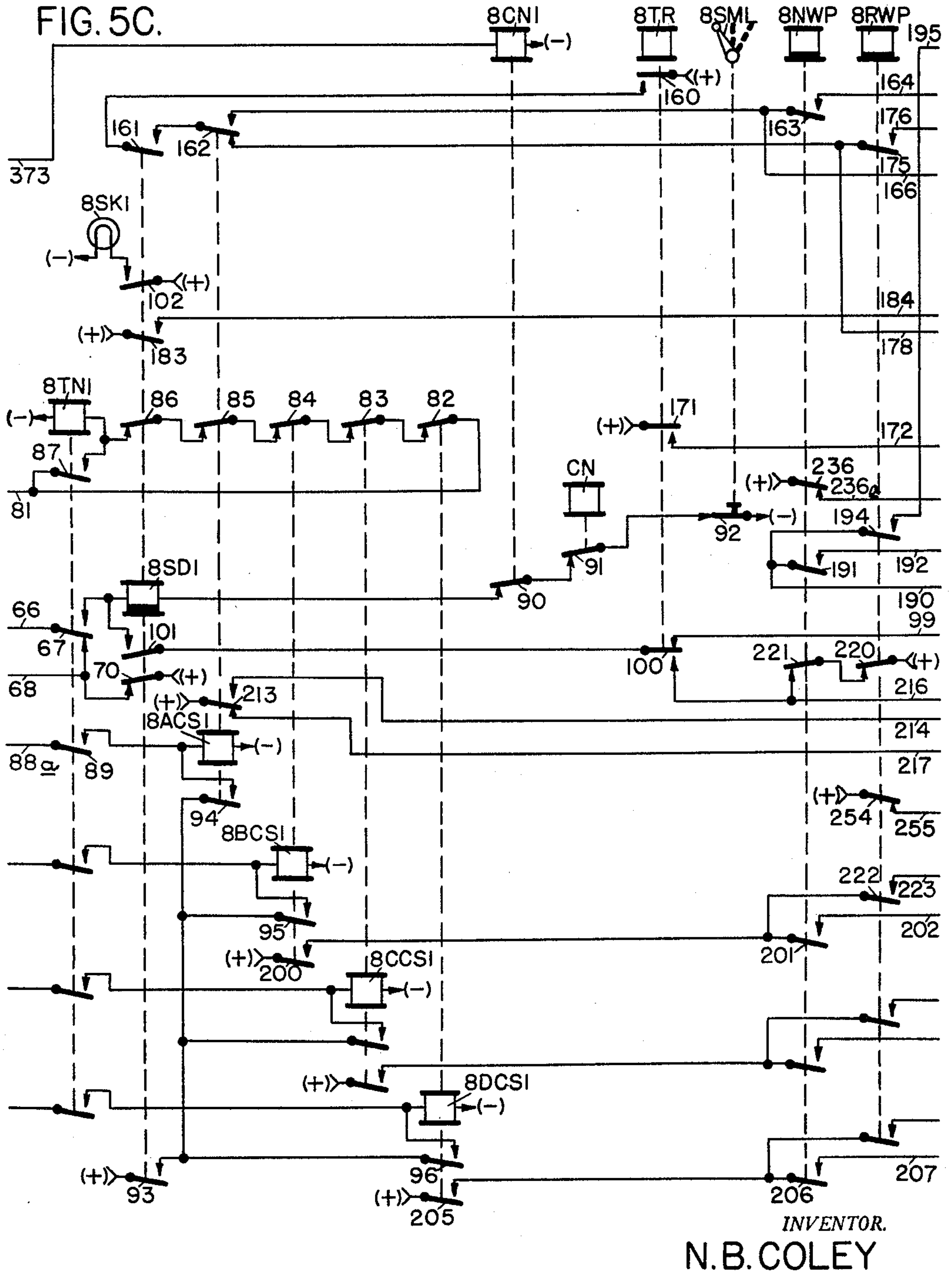
Figure 5D:
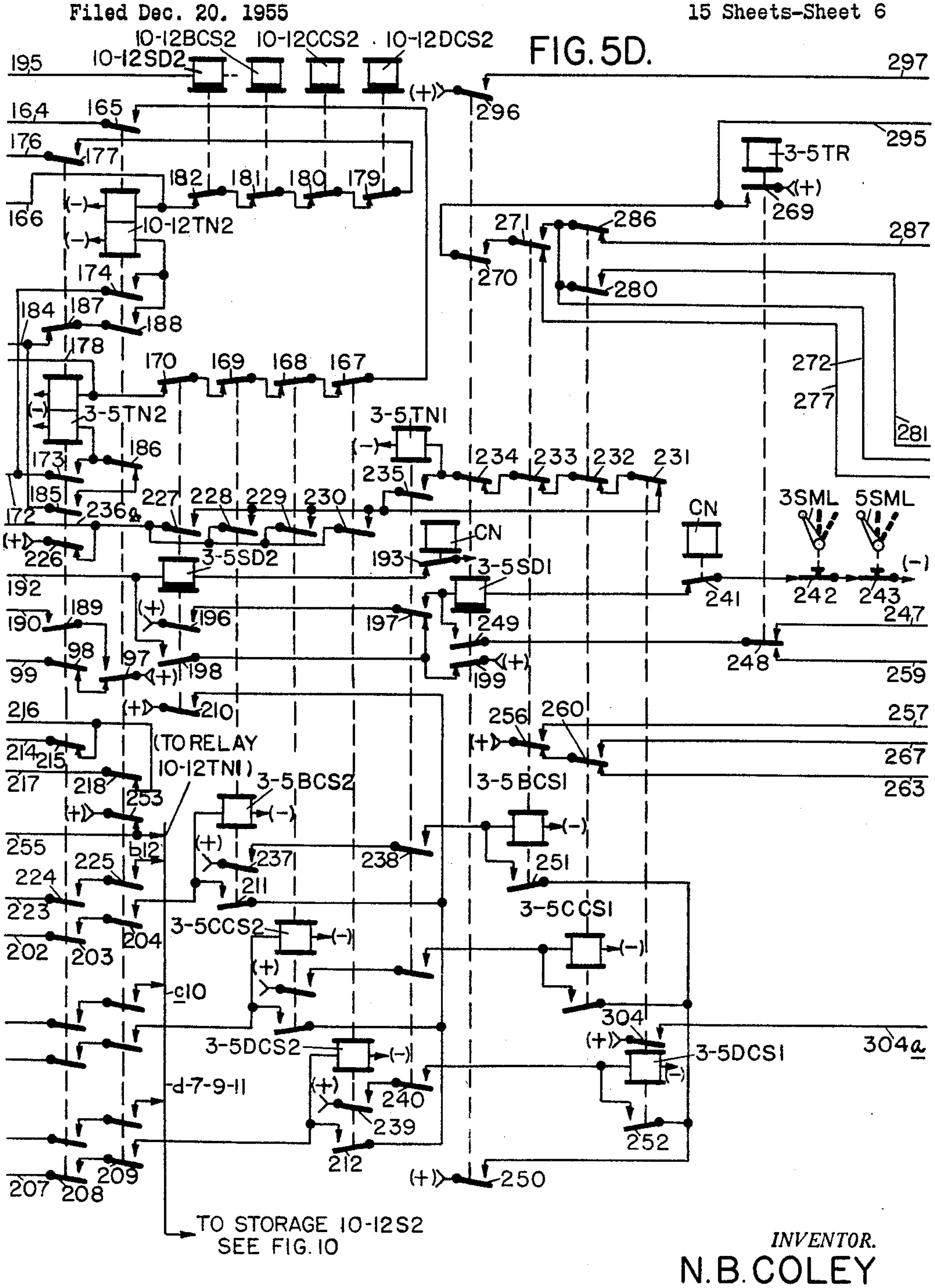

In Figs. 5C and 5D it can be seen that pick-up circuits for the code storage CS relays in the storage unit 10–12S2 are provided and are similar to those described for comparable relays in the storage unit 3–5S2. More specifically, relay 10–12BCS2 is provided with a pick-up circuit including front contact 200 of relay 8BCS1, front contact 222 of relay 8RWP, wire 223, front contact 224 of relay 3–5TN2, and front contact 225 of relay 10–12TN2, and the channel wire *b*12 which is indicated in the block diagram of Fig. 10. Similar pick-up circuits for relays 10–12CCS2 and 10–12DCS2 are provided and include, respectively, the channel wire *c*10 and *d*7–9–11. The numbers following each channel designating letter indicate specific switches which may be controlled from the channel wires *b*, *c* and *d* at the respective switch locations B, C and D.

A route description stored in the storage unit 3–5S2 can be transferred into the storage unit 3–5S1 whenever a previous storage is not stored in the latter unit. The transfer is initiated by the energization of relay 3–5TN1 by a pick-up circuit including back contact 226 of relay 3–5TN2, a parallel connection of front contacts 227, 228, 229 and 230 of relays 3–5SD2, 3–5BCS2, 3–5CCS2 and 3–5DCS2, respectively back contact 231 of relay 3–5DCS1, back contact 232 of relay 3–5CCS1, back contact 233 of relay 3–5BCS1 and back conact 234 of relay 3–5SD1. Relay 3–5TN1 is then held by a stick circuit including its front contact 235. Since the previously described pick-up circuit is dependent upon the closing of back contact 226 of relay 3–5TN2, a transfer cannot be initiated until relay 3–5TN2 is deenergized. Since, as previously described, relay 3–5TN2 is held energized at least as long as the track section associated with switch 8W is occupied, a transfer into the storage unit 3–5S1 cannot be effected until the car associated with the description has vacated switch 8W. In order to make the transfer into the unit 3–5S1 effective at the earliest possible moment, back contact 236 of relay 8NWP and wire 236*a* are connected in parallel with back contact 226 of relay 3–5TN2. Thus, when relay 8NWP is deenergized by the removal of the storage description from the storage unit 8S1, a transfer can be effected for permitting this description to progress into the storage unit 3–5S1. It is evident that a contact of the normal switch repeater 8NWP is required since the lap switches 3W and 5W lie in a normal route from switch 8W.

Assuming once again that the route description is for a car to be routed to track 1, relays 3–5BCS2 and 3–5DCS2 are energized in the storage unit 3–5S1. The picking up of the transfer relay 3–5TN1 results in the energization of relays 3–5BCS1 and 3–5DCS1. Relay 3–5BCS1 is energized by a pick-up circuit including front contacts 237 and 238 of relays 3–5BCS2 and 3–5TN1, respectively, while relay 3–5DCS1 is energized by a similar pick-up circuit including front contact 239 of relay 3–5DCS2 and front contact 240 of relay 3–5TN1. Concurrently, relay 3–5SD1 is energized by a pick-up circuit including front contact 196 of relay 3–5SD2, front contact 197 of relay 3–5TN1, the winding of relay 3–5SD1, back contact 241 of relay CN, and contacts 242 and 243 of the levers 3SML and 5SML, respectively. Since relay 3–5SD1 is associated with the controlling of both of the lap switches 3W and 5W, the cancellation means provided by switch levers must include contacts of both of the respective levers 3SML and 5SML associated with switches 3W and 5W. The opening of back contact 199 of relay 3–5SD1 which provides stick energy for relay 3–5SD2 causes relay 3–5SD2 to release its armature. Relay 3–5SD1 is then held energized by a stick circuit including back contact 244 of relay 6TN1, back contact 245 of relay 4TN2, back contact 246 of relay 2TN2, wire 247, front contact 248 of relay 3–5TR, and front contact 249 of relay 3–5SD1. It is evident that the stick circuit described for relay 3–5SD1 is similar to that described in detail for the similar relay 8SD1. In the case of relay 3–5SD1, however, back contacts of three succeeding transfer relays are included, since the lap switches 3W and 5W can be selectively positioned to lead to any one of three switches 2W, 4W or 6W. Front contact 250 of relay 3–5SD1 provides stick energy for relays 3–5BCS1 and 3–5DCS1 through their respective stick contacts 251 and 252.

After relay 3–5SD1 becomes energized and opens its back contact 199 to deenergize relay 3–5SD2, relay 3–5SD2 releases its armature. Front contact 210 of relay 3–5SD2 opens the tsick circuits for relay 3–5BCS2 and 3–5DCS2, causing the deenergization of those relays. Relay 3–5TN1 is then deenergized by the opening of its stick circuit which includes front contacts 227, 228 and 230 of the respective relays 3–5SD2, 3–5BCS2 and 3–5DCS2. Thus, the transfer of the route description from storage unit 3–5S2 to unit 3–5S1 is completed.

In instances where a route description is transferred from the storage unit 8S1 to unit 10–12S2, a subsequent transfer from unit 10–12S2 to unit 10–12S1 is performed in a similar manner to that described for units 3–5S2 and 3–5S1. A transfer relay 10–12TN1 (not shown) would be energized by a pick-up circuit including either back contact 253 of relay 10–12TN2 or back contact 254 of relay 8RWP and wire 255. This circuit is similar to that described for relay 3–5TN1 and requires the back contact 254 of relay 8RWP to permit the earliest possible transfer of a route description into storage unit 10–12S1, just as the pick-up circuit for relay 3–5TN1 required back contact 236 of relay 8NWP.

When the detector track section associated with the lap switches 3W and 5W is shunted, front contact 248 of relay 3–5TR opens the previously described stick circuit for relay 3–5SD1; and the subsequent closing of back contact 248 of relay 3–5TR renders relay 3–5SD1 dependent upon a stick circuit including contacts of the various transfer relays associated with succeeding switches in the switch group D. More specifically, when a route description is to be transferred to the storage unit 2S2, the stick circuit for relay 3–5SD1 includes front contact 256 of relay 3–5BCS1, wire 257, back contact 258 of relay 2TN2, and wire 259. Similarly, a description to be transferred to the storage unit 4S2 requires that relay 3–5SD1 be held by a stick circuit including back contact 256 of relay 3–5BCS1, front contact 260 of relay 3–5CCS1, wire 261, and back contact 262 of relay 4TN2. The third stick circuit of this type includes back contact 256 of relay 3–5BCS1, back contact 260 of relay 3–5CCS1, wire 263, and back contact 264 of relay 6TN1. It is evident from the preceding description that whenever the detector track section is shunted, thereby causing the transfer of a route description, a particular stick circuit for relay 3–5SD1 remains closed until the relevant transfer relay for a selected succeeding storage unit is energized. A correspondence check is provided in the stick circuits by contacts of the code storage relays 3–5BCS1 and 3–5CCS1 which determine the controlled positions of track switches 3W and 5W, respectively. Thus, the stick circuits for relay 3–5SD1 are similar to those previously described for relay 8SD1 and have similar functions. Relay 3–5SD1 is slow acting in releasing its armature and is thereby capable of retaining its armature during crossings of contact 248 of relay 3–5TR between its front and back contact points.

The switch control circuits associated with track switches 3W and 5W are assumed to be substantially identical to those described for switch 8W. Each of the lap switches 3W and 5W is assumed to be controlled independently with the exception that the switches are governed by a common detector track section; and under automatic operating conditions the two switches are governed by a common bank of code storage CS relays, relay 3–5BCS1 controlling switch 3W and relay 3–5CCS1 controlling switch 5W.

The switch repeater relays associated with switches 3W and 5W are normally deenergized and operate in essentially the same manner as relays 8NWP and 8RWP which were described previously. Since switches 3W and 5W form a lap switch location governed by common automatic switching apparatus, certain modifications must be made in the operating circuits for the switch repeater relays which require such circuits to differ from those described for relays 8NWP and 8RWP. Assuming for the present that the previous description of switch repeater relay (8NWP and 8RWP) operation applies to relays 3NWP, 3RWP, 5NWP and 5RWP (see Fig. 7A), a specific description of the operating circuits for these relays can be given in better form after a description has been given of the transfer of route descriptions from the storage unit 3–5S1 to the storage units 2S2, 4S2 and 6S1.

Since the switch repeater relays associated with switches 3W and 5W are normally deenergized and can be energized under automatic operating conditions only when relay 3–5SD1 is energized, a stick circuit including contacts of the various switch repeater relays is provided for permitting the sustained energization of relay 3–5SD1 whenever a route description is transferred into the storage unit 3–5S1 at a time when the detector track section is occupied. This stick circuit includes back contacts 265, 266, 267 and 268 of relays 5RWP, 5NWP, 3RWP and 3NWP, respectively.

In transferring route descriptions from the storage unit 3–5S1 to any of the storage units 2S2, 4S2 and 6S1 it is necessary to energize particular transfer relays when the detector track section at switches 3W and 5W becomes occupied. The mode of operation of the circuit means provided for selectively energizing the transfer relays 2TN2, 4TN2 and 6TN1 is essentially the same as that described for operating the transfer relays 3–5TN2 and 10–12TN2. More particularly, whenever a route description is to be transferred to a particular storage unit in accordance with the route described by the description the transfer relay associated with the particular storage unit can be energized only if correspondence exists between the actual and called-for positions of the track switch or switches at the location from which the transfer is being made; and furthermore, the transfer relay cannot be energized if a previous route description is already stored in the associated storage unit. In order to provide means for automatically cancelling route descriptions which cannot be transferred it is necessary to energize a transfer relay which is not related to the storage unit into which a route description is to be transferred. Therefore, as previously described, each of the transfer relays 3–5TN2 and 10–12TN2 could be energized either by correspondence pick-up circuit means or by direct pick-up circuit means; and both relays must be energized to effect a transfer from storage unit 8S1. The energization of only one of the transfer relays resulted in the cancellation of a route description when the associated cut of cars left the detector track section at switch 8W. In applying the same operating principles to pick-up circuits for relays 2TN2, 4TN2 and 6TN1, it can be generally stated that it is always necessary to energize one of the transfer relays, but never necessary to energize more than two. Therefore, the pick-up circuits to be described for relays 2TN2, 4TN2 and 6TN1 provide for the operation of the minimum number of transfer relays required in effecting either the transfer or the cancellation of a route description.

In the circuit diagrams the transfer relay 2TN2 can be energized by a correspondence pick-up circuit which includes back contact 269 of relay 3–5TR, front contact 270 of relay 3–5SD1, front contact 271 of relay 3–5BCS1, wire 272, front contact 273 of relay 3NWP, front contact 274 of relay 4TN2, back contact 275 of relay 2SD2, and back contact 276 of relay 2DCS2. No direct pick-up circuit for relay 2TN2 is provided, since it will be shown that it is not necessary to energize relay 2TN2 when transfers are made to either storage unit 4S2 or 6S1.

The correspondence pick-up circuit for relay 4TN2 includes back contact 269 of relay 3–5TR, front contact 270 of relay 3–5SD1, back contact 271 of relay 3–5BCS1, wire 277, front contact 278 of relay 3RWP, wire 272, front contact 280 of relay 3–5CCS1, wire 281, front contact 282 of relay 5NWP, front contact 283 of relay 6TN1, and back contacts 284 and 285 of relays 4SD2 and 4DCS2, respectively. The direct pick-up circuit for relay 4TN2 includes back contact 269 of relay 3–5TR, front contact 270 of relay 3–5SD1, front contact 271 of relay 3–5BCS1, back contact 286 of relay 3–5CCS1, and wire 287.

Relay 6TN1 can be energized by a correspondence pick-up circuit which includes back contact 269 of relay 3–5TR, front contact 270 of relay 3–5SD1, back contact 271 of relay 3–5BCS1, wire 277, front contact 278 of relay 3RWP, wire 272, back contact 286 of relay 3–5CCS1, wire 287, front contact 288 of relay 5RWP, front contact 289 of relay 4TN2, and back contacts 290 and 291 of relays 6SD1 and 6DCS1, respectively. The direct pick-up circuit for relay 6TN1 includes back contact 269 of relay 3–5TR, front contact 270 of relay 3–5SD1, back contact 271 of relay 3–5BCS1, wire 277, front contact 278 of relay 3RWP, wire 272, front contact 280 of relay 3–5CCS1 and wire 281.

Whenever any of the transfer relays 2TN2, 4TN2 and 6TN1 are energized, they are held energized as long as the detector track section 3–5T associated with the lap switches 3W and 5W is occupied. Stick contacts 292, 293 and 294 for relays 2TN2, 4TN2 and 6TN1, respectively, are included in stick circuits which are energized by back contact 269 of relay 3–5TR. In addition to stick circuits dependent solely upon track occupancy, alternate stick circuits are provided for each transfer relay, such stick circuits being dependent upon the continued storage of a route description in the storage unit 3–5S1; and these stick circuits are effective in causing the cancellation of route descriptions stored in the unit 3–5S1 whenever such descriptions cannot be transferred. No alternate stick circuit is provided for relay 2TN2 for reasons to be explained. The alternate stick circuit for relay 4TN2 includes front contact 296 of relay 3–5SD1, wire 297, back contact 299 of relay 2TN2, front contact 300 of relay 4TN2, and back contact 301 of relay 6TN1. Similarly, relay 6TN1 is held energized by an alternate stick circuit including front contact 296 of relay 3–5SD1, wire 297, back contact 302 of relay 4TN2, and front contact 303 of relay 6TN1.

When a route description stored in the storage unit 3–5S1 is to be transferred, contact 271 of relay 3–5BCS1 and contacts 286 and 280 of relay 3–5CCS1 are positioned in accordance with the route description in the pick-up circuits for relays 2TN2, 4TN2 and 6TN1. Thus, when the description calls for a route which includes track switch 2W, relay 3–5BCS1 is energized while relay 3–5CCS1 is not required to be energized (see code chart of Fig. 4). The correspondence pick-up circuit for relay 2TN2 is then effective, provided that switch 3W lies in its normal operated position, while the direct pick-up circuit for relay 4TN2 is effective irrespective of the position of switch 3W. When both of the relays 2TN2 and 4TN2 become energized they are held by their respective stick circuits, including back contact 269 of relay 3–5TR, until the associated cut of cars vacates the detector track section at switches 3W and 5W. If, however, relay 2TN2 cannot be energized either because of the failure of track switch 3W to assume its normal position or because of the storage of a previous route description in the storage unit 2S2 (back contact 275 of relay 2SD2 and/or back contact 276 of relay 2DCS2 being open), relay 4TN2 is additionally energized by its alternate stick circuit because of the closed condition of back contact 299 of relay 2TN2; and this alternate stick circuit is effective as long as front contact 296 of relay 3–5SD1 remains closed. Similarly, if the route description calls for a route including track switch 4W, relays 3–5BCS1 and 3–5CCS1 are respectively deenergized and energized, thereby positioning their respective contacts 271, 286 and 280 to permit the energization of relay 6TN1 by its direct pick-up circuit means and relay 4TN2 by its correspondence pick-up circuit means. If the route description defines a route including switch 6W both of the relays 3–5BCS1 and 3–5CCS1 are deenergized, resulting in the permissible energization of relays 4TN2 and 6TN1 by their respective direct and correspondence pick-up circuit means. The stick circuits for relay 4TN2 and 6TN1 including back contact 269 of relay 3–5TR are effective during track occupancy; and the alternate stick circuit for either relay is effective as long as the other relay fails to become energized. Since the failure of either relay 4TN2 or 6TN1 to become energized when called for results in the maintained energization of the other relay, there is no need for relay 2TN2 to be energized or held energized; and relay 2TN2 is not provided with either a direct pick-up circuit or an alternate stick circuit. A further reason for omitting direct pick-up circuit means for relay 2TN2 concerns back contact 299 of relay 2TN2 in the alternate stick circuit for relay 4TN2. If relay 6TN1 is to be energized by correspondence pick-up circuit means, relay 4TN2 is energized by direct pick-up circuit means and required to be held energized until relay 6TN1 becomes energized. If relay 2TN2 were energized by direct pick-up circuit means its contact 299 would open the alternate stick circuit for relay 4TN2. Thus, relay 4TN2 would be dependent solely upon its stick circuit which includes back contact 269 of relay 3–5TR; and relay 4TN2 would release its armature when the detector track section at switches 3W and 5W is vacated. Relay 4TN2 could not then cause the cancellation of a route description in storage unit 3–5S1 if relay 6TN1 could not be energized in accordance with the route description. It is further evident that back contact 299 of relay 2TN2 is required in the alternate stick circuit for relay 4TN2 for opening the stick circuit whenever relay 2TN2 is called for and energized by its correspondence pick-up circuit means.

If a route description is transferred into the storage unit 2S2, relay 2DCS2 can be energized, if required, by a pick-up circuit including front contact 304 of relay 3–5DCS1, wire 304*a*, front contact 305 of relay 3NWP, front contact 306 of relay 2TN2, and front contact 307 of relay 4TN2. Relay 2DCS2 must be energized whenever a route description calls for a route to classification track 1; and they relay is deenergized for a route to track 2. Correspondence is checked in the pick-up circuit by front contact 305 of relay 3NWP, which indicates switch position, and front contacts 306 and 307 of relays 2TN2 and 4TN2 respectively, which can be energized concurrently only when a transfer is made under conditions of route correspondence.

At the same time, relay 2SD2 is energized by a pick-up circuit including front contact 309 of relay 3NWP, front contact 310 of relay 2TN2, front contact 311 of relay 4TN2, the winding of relay 2SD2 and back contact 312 of the cancellation relay CN. Relay 2SD2 is then held energized by a stick circuit including its front contacts 313 and 314 and back contact 315 of relay 2TN1; and additional stick energy is supplied by back contact 316 of relay 2SD1. Front contact 317 of relay 2SD2 closes a stick circuit for relay 2DCS2, the stick circuit including front contact 318 of relay 2DCS2.

Similarly, a route description to be transferred to either of the storage units 4S2 or 6S1 results in the selective energization of a code storage relay 4DCS2 or 6DCS1 by a pick-up circuit similar to that described for relay 2DCS2. Both pick-up circuits include front contacts 304 of relay 3–5DCS1 and wire 304*a*. Selection is made through contacts 319, 320 and 321 of the switch repeater relays 3RWP, 5NWP and 5RWP, respectively. The complete pick-up circuit for relay 4DCS2 also includes front contacts 323 and 324 of relays 4TN2 and 6TN1, respectively; while the remainder of the pick-up circuit for relay 6DCS1 includes front contacts 326 and 327 of relays 4TN2 and 6TN1, respectively. Concurrently, a storage detection relay, either 4SD2 or 6SD1, is energized in a manner similar to that described for relay 2SD2. Both pick-up circuits include front contacts of the transfer relays 4TN2 and 6TN2, selection being made by contacts 328, 329 and 330 of relays 3RWP, 5NWP and 5RWP, respectively. Once energized, it is assumed that the various code storage CS relays and storage detection SD relays associated with the storage units 4S2 and 6S1 are held energized by stick circuit means identical to that described for similar relays in the storage unit 2S2.

In view of the preceding description of circuit operations resulting in the transferring or the cancellation of route descriptions stored in the storage unit 3–5S1, the circuits for operating the switch repeater relays 3NWP, 3RWP, 5NWP and 5RWP (see Fig. 7A) can be described.

Comparison between Figs. 6 and 7A shows that the operating circuits described for relays 8NWP and 8RWP are essentially identical to those for relays 3NWP, 3RWP, 5NWP and 5RWP, but modifications are made in the pick-up circuits for relays 3RWP, 5NWP and 5RWP and in the stick circuits for relays 5NWP and 5RWP. Such modifications are necessary because three routes are possible over switches 3W and 5W and because route descriptions can therefore be transferred to any of three storage units from storage unit 3–5S1.

Since switch 3W must be operated to its reverse position for routes leading to either of the switches 4W and 6W, route descriptions transferred to either of the storage units 4S2 or 6S1 from storage unit 3–5S1 require that switch 3W be operated to its reverse position, thereby causing relay 3RWP to be energized. As previously described, transfers to either of the storage units 4S2 or 6S1 are effected when relays 4TN2 and 6TN1 are energized. Thus, since relay 3RWP is associated with transfers of route descriptions to two storage units (4S2 and 6S1), parallel-connected back contacts of the associated transfer relays (4TN2 and 6TN1) must be included in the pick-up circuit for relay 3RWP, thereby causing relay 3RWP to operate in the same manner as switch repeater relays (8NWP or 8RWP, for example), which are associated with transfers to only one storage unit.

The previously described pick-up circuits for relays 8NWP and 8RWP were energized at one end by contact 110 of relay 8ACS1 (see Fig. 6). Similarly, a contact of relay 3–5BCS1 is included in the pick-up circuits for relays 3NWP and 3RWP, while a contact of relay 3–5CCS1 is included in the pick-up circuits for relays 5NWP and 5RWP. In addition, however, back contacts of relay 3–5BCS1 are included in both the pick-up and stick circuits for relays 5NWP and 5RWP, thereby causing those relays to be deenergized whenever a stored route description calls for a route to either track 1 or track 2. In other words, relay 3–5BCS1 is energized under such routing conditions to call for the normal positioning of switch 3W.

The reason for preventing relays 5NWP and 5RWP from being energized when a route description relates to routes leading to tracks 1 and 2 can be explained with reference to the circuits described foro perating the transfer relays 2TN2, 4TN2 and 6TN1 (see Figs. 5D and 5E). The transfer of a route description to storage unit 2S2 is effected when relay 4TN2 is energized by its direct pick-up circuit and relay 2TN2 is energized by its correspondence pick-up circuit, such relay energizations taking place in response to the shunting of the track section 3–5T by a cut of cars associated with the route description. If at this time relay 5RWP were energized relay 6TN1 could also become energized through its correspondence pick-up circuit which includes front contacts 288 and 289 of relays 5RWP and 4TN2, respectively. If relay 6TN1 could be energized as well as relay 4TN2, the stick circuits for relays 4TN2 and 6TN1 which include front contact 296 of relay 3–5SD1 and wire 297 would be open. In other words, back contact 301 of relay 6TN1 would be open in the stick circuit for relay 4TN2 and back contact 302 of relay 4TN2 would be open in the stick circuit for relay 6TN1. Such conditions are permissible if relay 2TN2 can be energized to effect a transfer; but if relay 2TN2 cannot be energized while the detector track section 3–5T is occupied, such conditions would result in the failure to cancel the route description stored in storage unit 3–5S1. In other words, when the track section 3–5T is vacated relay 4TN2 must remain energized to hold open its back contact 245 in the stick circuit for relay 3–5SD1 which also includes wire 247 and front contact 248 of relay 3–5TR. Therefore, relay 6TN1 must be prevented from becoming energized whenever a transfer to storage unit 2S2 is required. Since (see Fig. 7A) neither of the switch repeater relays 5NWP and 5RWP can be energized under such routing conditions (relay 3–5BCS1 energized), the energization of relay 6TN1 is impossible and the cancellation of route descriptions which cannot be transferred is always possible.

The transferring of a route description from storage unit 2S2 into the storage unit 2S1 requires the energization of the transfer relay 2TN1. This relay is energized by a pick-up circuit including either back contact 331 of relay 3NWP or back contact 332 of relay 2TN2, either front contact 333 of relay 2SD2 or front contact 334 of relay 2DCS2, and back contacts 335 and 336 of relays 2DCS1 and 2SD1, respectively. A stick circuit for relay 2TN1 including its front contact 337 is then closed. A similar pick-up circuit for the transfer relay 4TN1 includes back contacts 338 and 339 of relays 3RWP and 5NWP, respectively, or back contacts 340 of relay 4TN2. Since it is assumed that only one route description can be stored for the track switch 6W, only one storage unit 6S1 is provided, and the pick-up circuits for relay 6TN1 were described in conjunction with those for relays 2TN2 and 4TN2.

The code storage relay 2DCS1 can be selectively energized by a pick-up circuit including front contacts 341 and 342 respectively of relays 2DCS2 and 2TN1. At the same time, the storage detection relay 2SD1 is energized by a pick-up circuit including front contact 313 of relay 2SD2, front contact 315 of relay 2TN1, the winding of relay 2SD1, back contact 343 of relay CN, and contact 344 of the lever 2SML. Relay 2SD1 is then held energized by a stick circuit including front contact 345 of relay 2TR and front contact 346 of relay 2SD1. The closing of front contact 347 of relay 2SD1 provides stick energy for relay 2DCS1 through its front contact 348.

In addition to the stick circuit for relay 2SD1 which includes front contact 345 of relay 2TR, a second stick circuit is provided which includes back contact 345 of relay 2TR and front contacts 349 and 350 of relays 2RWP and 2NWP, respectively. The latter stick circuit is effective only under certain conditions which will be described when the mode of operation of the switch repeater relays for switch 2W is disclosed.

When relay 2SD1 is energized, its back contact 316 opens the stick circuit for relay 2SD2. Relay 2SD2 is then deenergized resulting in the deenergization of relay 2DCS2 and relay 2TN1. A route description is now completely transferred from the storage unit 2S2 to the storage unit 2S1.

It is assumed that similar pick-up and stick circuits are provided for the various storage detection relays SD and code storage relays CS in the storage units 4S2 and 6S1. In the case of storage unit 6S1, however, it is evident that the pick-up circuits for these relays are energized in response to the condition of corresponding relays in the storage unit 3–5S1, since only one storage unit is provided for operating switch 6W.

The switch control circuits for switches 2W, 4W and 6W are assumed to be substantially the same as those described for switch 8W. However, the switch repeater relays associated with these or any of the other track switches at switch location D are operated in a different manner than those described for track switches at other locations. Since switch 2W, for example, is the last switch to be encountered in routes to tracks 1 or 2, route descriptions need not be transferred or retained when associated cuts of cars occupy the detector track section at switch 2W.

In Fig. 7B, the switch repeater relays 2NWP and 2RWP are usually energized by either of two distinct pick-up circuits. One pick-up circuit includes front contact 351 of relay 2SD1, and the second pick-up circuit includes contact 352 of the lever 2SML. Thus, depending on the position assumed by the track switch 2W, either switch repeater relay can be energized in response to either route descriptions or manual lever operations. Each relay has an alternate pick-up circuit which excludes contacts of switch machine 2SM and point detector 2PD. This pick-up circuit is provided to permit the energization of both of the switch repeater relays whenever a route description is introduced into the storage unit 2S1 at a time when the detector track section 2T is occupied. Front contact 354 of relay 2TN1 and back contact 355 of relay 2TR are included in the alternate pick-up circuit for relay 2NWP, while front contact 356 of relay 2TN1 and back contact 357 of relay 2TR are included in the alternate pick-up circuit for delay 2RWP. Therefore, during periods of track occupancy the energization of relay 2TN1 results in the concurrent energization of relays 2NWP and 2RWP.

Figure 5E:
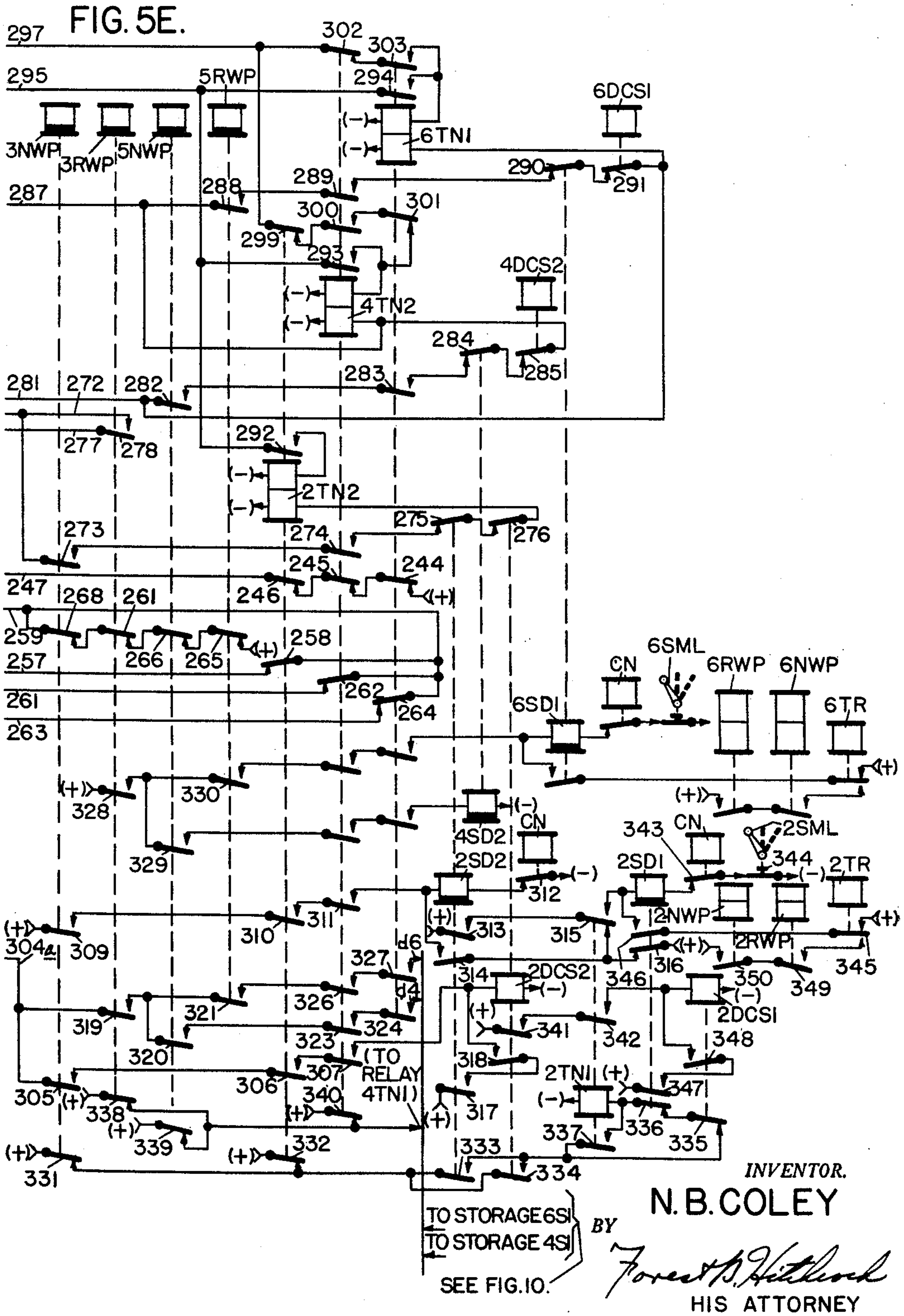

The purpose in permitting energization of both of the switch repeater relays 2NWP and 2RWP becomes apparent in examining the previously described stick circuit for relay 2SD1 (see Fig. 5E). As previously described, relay 2SD1 is energized when a route description is stored in the storage unit 2S1, and relay 2SD1 is initially held by a stick circuit including front contact 345 of relay 2TR. When the cut of cars associated with the route description shunts the track relay 2TR, front contact 345 of relay 2TR opens the stick circuit for relay 2SD1. Since the cut of cars has now encountered the last track switch in its route, the route description must be dropped from the system; and the dropping of the route description occurs upon the deenergization of relay 2SD1. The alternate stick circuit for relay 2SD1 which includes front contacts 349 and 350 of the respective relays 2RWP and 2NWP is open under such conditions, since only one of the two relays is energized by its stick circuit. When relay 2SD1 closes its back contact 336 in the pick-up circuit for relay 2TN1, a subsequent route description can be transferred into the storage unit 2S1. Therefore, if this occurs while the detector track section is occupied, relays 2NWP and 2RWP are both energized, as previously described, resulting in the closing of the alternate stick circuit for relay 2SD1. The subsequent route description can then be retained because of the closed condition of the alternate stick circuit for relay 2SD1. When the cut of cars vacates the detector track section, contact 345 of relay 2TR crosses over from its back to its front contact point to apply direct energy to the primary stick circuit for relay 2SD1. Since relay 2SD1 is slow-acting, it retains its armature during the crossing over of contact 345 of relay 2TR and thereby maintains the storage of the second route description.

As described, relays 2NWP and 2RWP must both be energized to maintain a route description transferred into and stored by storage unit 2S1 during times when the detector track section 2T is occupied. It must be noted that the alternate pick-up circuits described for relays 2NWP and 2RWP are effective under conditions of track occupancy only for as long as relay 2TN1 is energized. From the previous descriptions of transfer circuit operations it can be recalled that relay 2TN1 is deenergized as soon as a transfer is completed from storage unit 2S2 to storage unit 2S1. Thus, it is necessary to provide stick circuits for relays 2NWP and 2RWP which are capable of holding these relays energized under such conditions of track occupancy and route description storage. The stick circuits for relays 2NWP and 2RWP are essentially obvious, including the lower windings of the respective relays and extending through back contact 358 of relay 2TR. The stick circuits for relays 2NWP and 2RWP are arranged to be effective only when both relays are energized concurrently in the manner previously described.

It should be noted that relays 2NWP and 2RWP are not slow-acting, thereby differing from the switch repeater relays described for switches 8W, 3W and 5W. In the latter cases, slow-release characteristics were required to bridge operations of the associated SD1 relays at times when associated levers SML were in manual operating positions. Therefore, because of different modes of operation, switch repeater relays associated with track switches which lead directly to classification tracks do not need to be slow-acting, while any switches which lead to any other switches must have slow-acting switch repeater relays.

In Fig. 7B, the switch indication lights 2NK and 2RK are shown energized by pick-up circuits which include contacts of the respective switch repeater relays. Lamp 2NK is energized by a circuit including front contact 360 of relay 2NWP and back contact 361 of relay 2RWP. Similarly, the energizing circuit for the lamp 2RK includes back contact 360 of relay 2NWP and front contact 362 of relay 2RWP. In the described circuits, it is evident that either of the indication lights can be energized only when the switch repeater relay associated with the indicated position is energized, while the other switch repeater relay is deenergized. In this manner, a switch indication light is not illuminated unless the switch is called for by either automatic or manual means; and furthermore, the energization of both switch repeater relays does not result in the energization of either indication light.

Whenever a track switch leads directly to classification tracks there is no need to check track switch position insofar as the transfer and/or cancellation of route descriptions are concerned. Therefore, the concurrent energization of both of the switch repeater relays is permissible while the associated detector track section is occupied.

In the case of the switch repeater relays and indication lights associated with track switches 4W and 6W energizing circuits similar to those described for switch 8W are provided. The circuits for switch 4W are not shown, while those for switch 6W are shown in Fig. 7C. The circuits for operating relays 6NWP and 6RWP differ from those described for relays 2NWP and 2RWP in that the alternate pick-up circuits for the switch repeater relays 6NWP and 6RWP must be altered to provide proper circuit operations under conditions wherein a long cut of cars may concurrently occupy the detector track sections at switch 6W and at switches 3W and 5W. The alternate stick circuits for relays 6NWP and 6RWP include front contacts 363 and 364, respectively, of relay 5RWP.

More specifically, assume that a cut of cars occupies the detector track section at the lap switches 3W and 5W, causing the transfer of a route description into the storage unit 6S1; and it should be noted that only one storage unit is provided for switch 6W. Relay 6SD1 and one or the other of the switch repeater relays 6NWP and 6RWP becomes energized. Relay 6TN1 also remains energized as long as the cut of cars continues to shunt the detector track section at switches 3W and 5W. When the cut of cars enters the detector track section at switch 6W, while still occupying the preceding detector track section, the alternate pick-up circuits for relays 6NWP and 6RWP would be closed if contacts 363 and 364 of relay 5RWP were not provided. Therefore, the energization of both of the switch repeater relays would prevent the cancelling of the route description because the alternate stick circuit for relay 6SD1 would be closed, and relay 6SD1 is slow-acting to bridge operations of contacts of the track relay 6TR. If operations of this sort were permitted, the effective dropping of route descriptions could not be accomplished, resulting in the eventual tying-up of the track switch 6W. Relay 6RWP which is the switch repeater relay associated with the position which track switch 5W must assume for routes leading to track switch 6W, is deenergized under automatic switching conditions whenever a route description is transferred out of the storage unit 3–5S1. Therefore, in the case of a long cut of cars, relay 5RWP is deenergized before the cars reach the detector track section at switch 6W and prevents the concurrent energization of relays 6NWP and 6RWP. It is assumed that pick-up circuits for the switch repeater relays associated with any track switch leading directly to classification tracks are similar to either those described for switch 2W or for switch 6W, depending on whether a track switch is provided with two or one route description storage units.

In view of the preceding descriptions of circuit operation, it is evident that the switch control levers SML associated with particular track sections can be positioned in manual control positions and still permit automatic operations by the system. Under such conditions, switch machines governed by manual lever positions cannot be moved to contrary positions called for by route descriptions. Therefore, the ability of the system to transfer route descriptions is dependent upon agreement between switch positions called for by manual and automatic means. If agreement does not exist between the controls, route descriptions are automatically cancelled as soon as associated cuts of cars leave relevant track switch locations.

*Cancellation of route descriptions*

As previously described, each switch machine lever SML includes a normally closed contact which can be opened by pulling the lever against a spring bias. Such lever contacts are utilized in the pick-up and stick circuits for the storage detection relays SD1 associated with the storage units active in controlling respective track switches. In the storage unit 8S1, for example, relay 8SD1 is energized by pick-up and stick circuits (see Fig. 5C) which include contact 92 of the lever 8SML. Whenever it is desirable to cancel the description in the storage unit 8S1, a pulling of the lever 8SML results in the deenergization of relay 8SD1 which, in turn, deenergizes any of the code storage CS relays which may be energized.

Cancellation of any route descriptions which may be stored in the storage units associated with switch 8W can be effected by operations of cancel button 8CNB. In Figs. 5B and 5C, contact 366 of the cancel button 8CNB is shown to be capable of applying energy to various pick-up and stick circuits for cancellation relays 8CN3, 8CN2 and 8CN1; and each of the cancellation relays is associated with a particular storage unit. Assume that route descriptions for three successive cuts of cars are introduced into the system by the hump conductor. The storage units 8S1, 8S2, and 8S3 then each contain a route description storage. If at this time the cancel button 8CNB is depressed, relay 8CN3 is energized by a pick-up circuit including contact 366 of the cancel button 8CNB and front contact 367 of relay PBP. As long as the cancel button 8CNB is held depressed relay 8CN3 is held energized by a stick circuit including its front contact 368. The energization of relay 8CN3 opens back contact 29 in the pick-up circuit for relay PBP, resulting in the deenergization of relay PBP and, subsequently, any of the push button relays PBR which may be energized for the particular route description stored. When the cancel button 8CNB is released, the pick-up and stick circuits for relay 8CN3 are opened.

A second operation of the cancel button 8CNB results in the energization of relay 8CN2 by a pick-up circuit including contact 366 of the cancel button 8CNB, back contact 367 of relay PBP, back contact 369 of relay 8CN3, and front contact 370 of relay 8SD2. A stick circuit including front contact 371 of relay 8CN2 then closes to maintain energization of relay 8CN2 as long as the cancel button 8CNB is depressed. Relay 8CN2, when energized, opens its back contact 62 in the previously described pick-up and stick circuits for relay 8SD2. Relay 8SD2 is then deenergized, resulting in the deenergization of any of the associated code storage CS relays. When the cancel button 8CNB is released, the pick-up and stick circuits for relay 8CN2 are opened.

A third operation of the cancel button 8CNB results in the energization of relay 8CN1 by a pick-up circuit including contact 366 of the cancel button 8CNB, back contact 367 of relay PBP, back contact 369 of relay 8CN3, back contact 370 of relay 8SD2, back contact 372 of relay 8CN2, and wire 373. Relay 8CN1, when energized, opens its back contact 90 to deenergize relay 8SD1 which, in turn, deenergizes any of the associated code storage CS relays.

The cancel button 8CNB is therefore effective in cancelling the last stored route description each time it is operated. In order to cancel all route descriptions stored in the automatic switching system, cancel button CNB is provided and acts to energize a cancellation relay CN. Contacts of the cancellation relay CN are shown throughout the circuit diagrams and are included in the pick-up and stick circuits for all of the storage detection relays SD in the system. Therefore, whenever the cancel button CNB is operated, the cancellation relay CN is energized by contact 374 of the cancellation button CNB and causes the opening of all of the energizing circuits for the various storage detection relays, thereby resulting in the deenergization of any or all of the code storage CS relays provided. The cancel button CNB also deenergizes any route descriptions stored in the storage unit 8S3 by the opening of its front contact 26 in the previously described pick-up and stick circuits for relay PBP.

The cancellation of route descriptions results in the extinguishing of the various storage indication lights 8SK1, 8SK2 and 8SK3 which are located on the hump conductors control machine panel P1 (see Fig. 1). Furthermore, cancellations result in the extinguishing of any relevant switch indication lights NK and RK which are provided on the tower control machine panel P2 (see Fig. 2). Thus, in general, an effective cancellation of any sort can be verified by observing particular indication lights at the location or locations where cancellations are effected.

*Automatic routing of two successive cars*

In view of the preceding description of the mode of operation of the automatic switching circuits, an operational description of system operation for successive cars can be given. In Figs. 8A–8M, the progress of two cars is traced through the yard of Fig. 3. The sequence of relay operations is shown in the companion drawings, Figs. 9A–9M. In tracing such operations, reference is also made to the block diagram of Fig. 10.

Figure 8A:
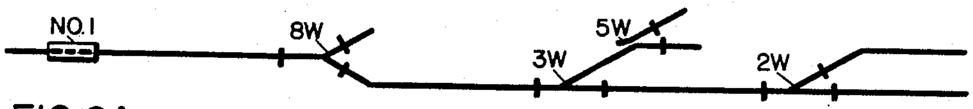
Figure 9A:
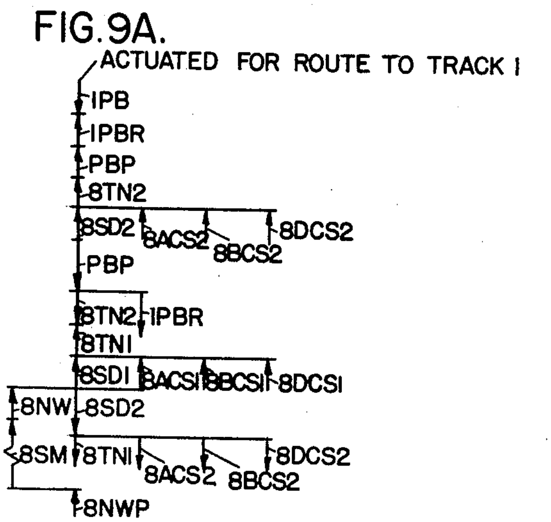

In Fig. 8A, a car No. 1 is shown approaching switch 8W before or after leaving the hump. Assuming that car No. 1 is to be routed to classification track 1, the hump conductor actuates the route push button 1PB. The push button repeater relay 1PBR is then energized in the storage unit 8S3, acting to describe a route to track 1. If no descriptions are stored in the storage unit 8S2, the description will advance into that storage unit from storage unit 8S3. Relays 8ACS2, 8BCS2 and 8DCS2 are energized in storage unit 8S2 in accordance with the selective energization of the route selection busses by the relay 1PBR. If at this time, the storage unit 8S1 stores no descriptions, the route description for car No. 1 is transferred from the storage unit 8S2 into the storage unit 8S1, resulting in the energization of the code storage relays 8ACS1, 8BCS1 and 8DCS1. The normal switch control relay 8NW is then energized in accordance with the route called for by relay 8ACS1 and causes the switch machine 8SM to be operated to its normal position. As soon as track switch 8W is fully positioned, the switch repeater relay 8NWP is energized. Thus, the route description for car No. 1 has effected the positioning of track switch 8W for routing car No. 1 in the direction of track 1.

Figure 8B:
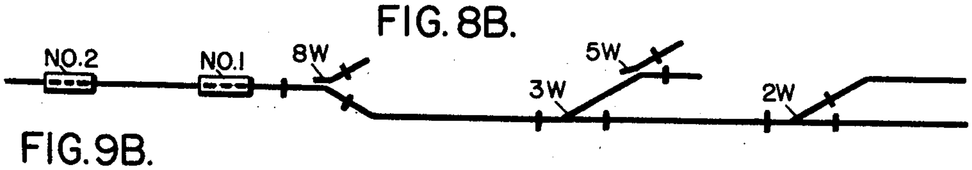

Assume that a second car No. 2 which is to be routed to classification track 2 now passes the hump conductor. The conductor actuates push button 2PB which, in turn, energizes relay 2PBR in the storage unit 8S3. Since the storage unit 8S2 is vacant, the route description for car No. 2 is transferred from the storage unit 8S3 into the storage unit 8S2, resulting in the energization of relays 8ACS2 and 8BCS2. This situation is shown in Figs. 8B and 9B wherein it is also assumed that car No. 1 has not yet reached the detector track section at switch 8W.

When car No. 1 enters the detector track section at switch 8W (see Fig. 8C), the associated route description is transferred from the storage unit 8S1 to the storage unit 3–5S2. Relays 3–5BCS2 and 3–5DCS2 are energized in storage unit 3–5S2 in accordance with the preselected energization of the route channels. If no description is stored in the storage unit 3–5S1, the route description for car No. LF is transferred immediately into that storage unit from storage unit 3–5S2. Relay 3NW is then energized to cause the switch machine 3SM to position track switch 3W in its normal position, thereby aligning a route for car No. 1 in the direction of classification track 1. As soon as the route description for car No. 1 leaves the storage unit 8S1, the route description for car No. 2 is transferred into that storage unit from storage unit 8S2, causing relays 8ACS1 and 8BCS1 to be energized.

When car No. 1 leaves the detector track section at switch 8W (see Fig. 8D) the normal switch control relay 8NW is energized. However, since switch 8W already assumes its normal position, relay 8NW is ineffective in operating the switch machine 8SM.

Figure 8C:
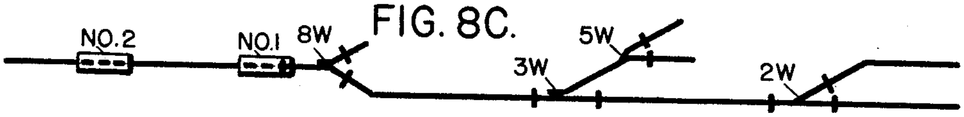
Figure 8D:
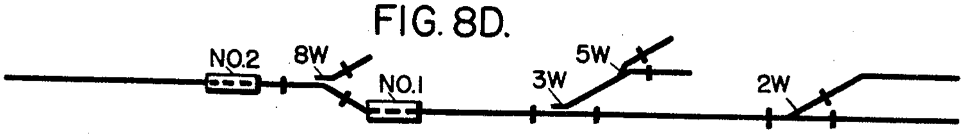
Figure 8E:
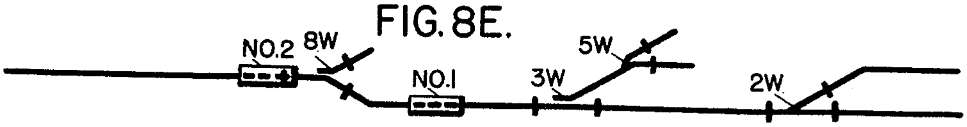
Figure 9E:
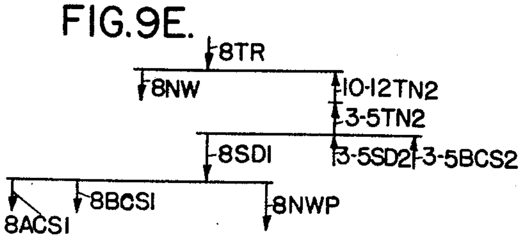
Figure 8F:
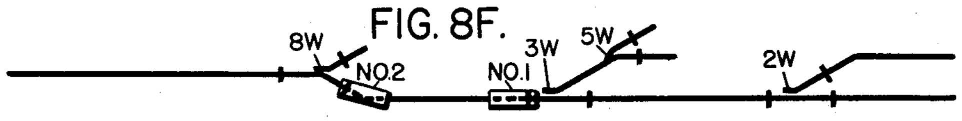
Figure 9F:
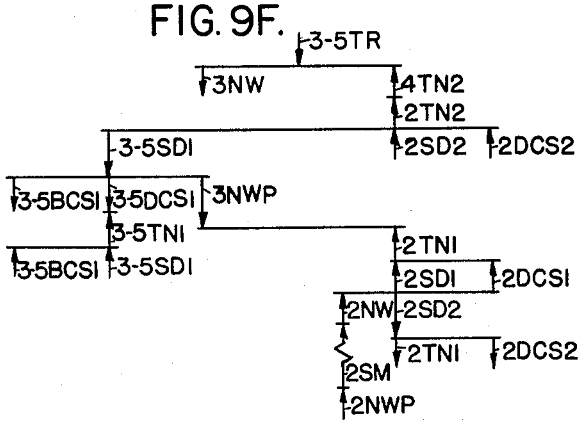
Figure 8G:
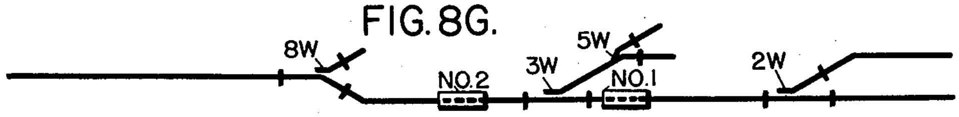
Figure 9G:
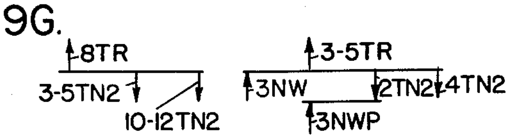
Figure 8H:
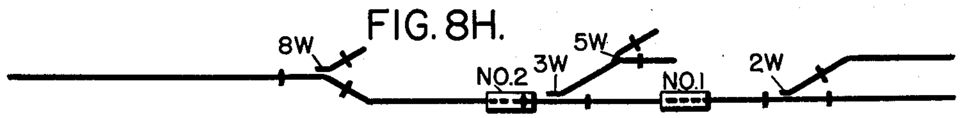
Figure 9H:
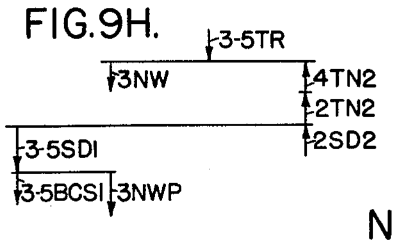
Figures 8J, 9J:
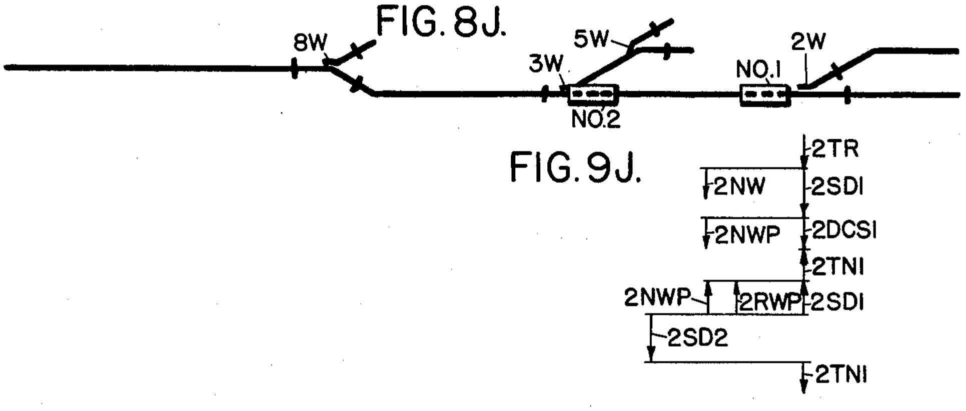
Figures 8K, 9K:
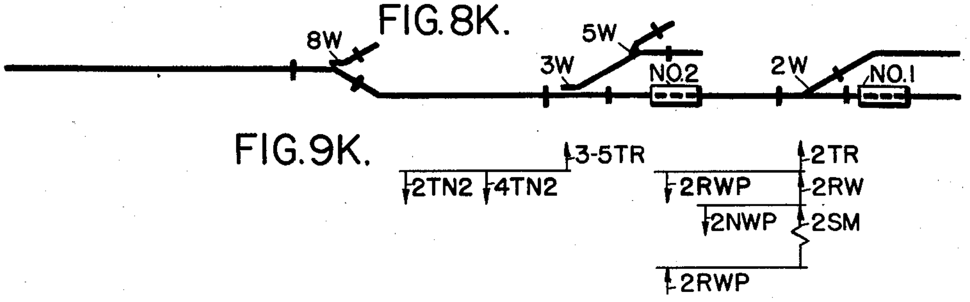

In Fig. 8E, car No. 2 is shown entering the detector track section at switch 8W. This causes the transfer of the route description for car No. 2 from the storage unit 8S1 to the storage unit 3–5S2, energizing relay 3–5BCS2.

When car No. 1 enters the detector track section at lap switches 3W and 5W (see Fig. 8F), the route description associated with car No. 1 is transferred from the storage unit 3–5S1 to the storage unit 2S2, resulting in the energization of the code storage relay 2DCS2.

This transfer operation results in the deenergization of the various relays in the storage unit 3–5S1, and the resulting dropping-away of relay 3NWP causes the route description to advance from storage unit 2S2 into storage unit 2S1, energizing relay 2DCS1. This results in the energization of relay 2NW which causes the switch machine 2SM to operate the track switch 2W to its normal position, thereby completing a route to track 1 for car No. 1. The departure of the route description for car No. 1 from the storage unit 3–5S1 permits the transferring of the route description for car No. 2 into that storage unit from the storage unit 3–5S2, resulting in the energization of relay 3–5BCS1.

When car No. 1 leaves the detector track section associated with switches 3W and 5W (see Fig. 8G) the switch control relay 3NW is energized. However, the switch machine 3SM is not operated because switch 3W already assumes its normal position.

The arrival of car No. 2 on the detector track section at switches 3W and 5W (see Fig. 8H), causes the transfer of the route description for car No. 2 from the storage unit 3–5S1 into the storage unit 2S2. At this time, the route descriptions for both cars No. 1 and No. 2 are stored in the storage units provided for switch 2W.

When car No. 1 enters the detector track section at switch 2W (see Fig. 8J), the route description for car No. 1 is dropped from the system. The route description for car No. 2 is then permitted to be transferred into the storage unit 2S1 from the storage unit 2S2.

When car No. 1 then leaves the detector track section at switch 2 (see Fig. 8K), the route description for car No. 2 causes the energization of the switch control relay 2RW which in turn energizes the switch machine 2SM in order to position the track switch 2W in its reverse position. Switch 2W is now aligned to route car No. 2 to classification track.

Figures 8L, 9L:
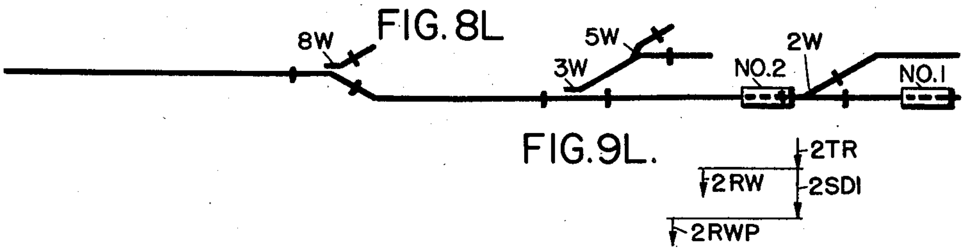
Figures 8M, 9M:
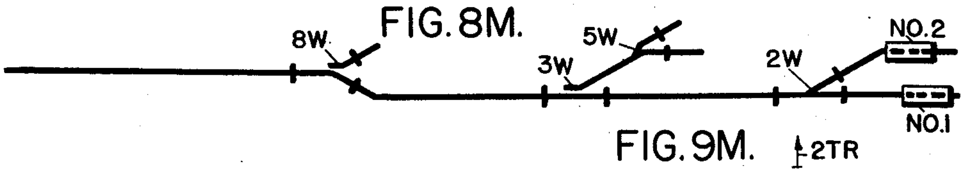

The route description for car No. 2 is dropped from the system when car No. 2 enters the detector track section at switch 2W (see Fig. 8L). No further circuit operation is then required and car No. 2 is assumed to proceed into track 2 (see Fig. 8M). The system is now completely in its normal condition.

It should be obvious that similar circuit operations are effected throughout the yard for successive cars provided that such successive cars are properly spaced, that is, so that two cars cannot occupy the same detector track section at the same time.

Having described an automatic switching system as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. In a system for the automatic control of a plurality of track switches in a classification yard, storage means associated with each of the track switches for storing route descriptions for the routes of cars to be classified including storage of the normal or reverse switch position required for the associated track switch, switch control means selectively operable to normal or reverse positions for operating each of the track switches in accordance with the stored route description of its associated storage means to corresponding normal and reverse positions, transfer relays provided for the respective normal and reverse positions of a given one of the track switches for the transfer of storages of route descriptions, circuit means responsive to a car approaching said given track switch for energizing both of said transfer relays provided that said given track switch is in correspondence with the condition called for by said switch control means, said circuit means being effective to energize only a selected one of said transfer relays when a car approaches said given track switch if said given track switch is in a normal or a reverse position out of correspondence with the normal or reverse position called for by said switch control means for the associated track switch, circuit means effective upon a car approaching said given track switch for transferring route descriptions from said storage means associated with said given track switch to a selected one of said storage means only provided that both of said transfer relays are energized, and cancellation means including a circuit for automatically cancelling said storage means associated with said given track switch without transfer of such route description when only one of said transfer relays is energized.

2. In a system for automatically controlling a plurality of track switches in a classification yard, storage means associated with each of the track switches for storing route descriptions for the routes of cars to be classified including storage of the normal or reverse switch position required for the associated track switch, switch control means selectively operable to normal or reverse positions for operating each of the track switches in accordance with the stored route description of its associated storage means to corresponding normal and reverse positions, normally deenergized transfer relays provided for respective normal and reverse positions of a given one of the track switches for the transfer of storages of route descriptions, normally deenergized switch repeater relays associated with the respective normal and reverse positions of said given track switch, circuit means responsive to the storage of a route description by the storage means associated with said given track switch for energizing either one or the other of said switch repeater relays selectively in accordance with the actual normal or reverse position of said given track switch, said circuit means being rendered effective to energize the switch repeater relay associated with either the normal or reverse position of said one track switch only when the transfer relay associated with the corresponding track switch position is deenergized, circuit means including contacts of said switch repeater relays selectively for energizing both of said transfer relays when a car approaches said given track switch provided that said track switch is in correspondence with the position called for by said switch control means, and transfer circuit means for transferring route descriptions out of the storage means associated with said given track switch only provided that both of said transfer relays are energized, said transfer circuit means being effective to cancel storage of a route description after transfer has taken place or when only one of said transfer relays is energized.

3. In an automatic switching system for controlling a plurality of track switches having respective detector track sections in a classification yard, storage means associated with each of the track switches for storing route descriptions for the routing of cars to be classified, switch control means for operating each of the track switches in accordance with the stored route description of the associated storage means, normally deenergized transfer relays associated with routes over the respective normal and reverse positions of a given track switch, correspondence pick-up circuit means for selectively energizing one or the other of said transfer relays when a route description is stored by the storage means associated with said given track switch provided that the actual and called-for positions of said given track switch are in correspondence, direct pick-up circuit means for selectively energizing a particular one of said transfer relays when a route description is stored by the storage means associated with said given track switch provided that the route description calls for a route over a position of said given track switch opposite to the position associated with the particular transfer relay, stick circuit means for energizing said transfer relays while a cut of cars occupies the detector track section associated with said given track switch, alternate stick circuit means for energizing either of said transfer relays when the other transfer relay is deenergized, said alternate stick circuit being effective as long as a route description is stored by the storage unit associated with said given track switch, circuit means for holding route descriptions stored in the storage means associated with said given track switch only when the associated detector track section is unoccupied and both of said transfer relays are deenergized, and alternate circuit means for holding route descriptions stored by the storage means associated with said given track switch only when the associated detector track section is occupied and the transfer relay associated with the route called for by the stored route description is deenergized.

4. In an automatic switching system for controlling a plurality of track switches having respective detector track sections in a classification yard, storage means associated with each of the track switches for storing route descriptions for the routing of cars to be classified, switch control means for operating each of the track switches in accordance with the stored route description of the associated storage means, manually operable means associated with each of the track switches for operating the associated switch control means irrespective of the condition of the associated storage means, a normally deenergized transfer relay associated with a given one of the track switches for transferring route descriptions into the associated storage means, circuit means responsive to the shunting of the detector track section at the track switch immediately preceding said given track switch for energizing said transfer relay whenever a route description is to be transferred into the storage means associated with said given track switch, said circuit means being effective only if the associated storage means is vacant, normally deenergized switch repeater relays associated with the respective normal and reverse positions of said given track switch, pick-up circuit means for energizing one or the other of said switch repeater relays in accordance with the position assumed by said given track switch, said pick-up circuit means being rendered effective either by operations of the associated manually operable means or by operations of the associated storage means, alternate pick-up circuit means for energizing each of said switch repeater relays irrespective of the position assumed by said given track switch, said alternate pick-up circuit means including front contacts of the associated transfer relay and being effective only when the associated detector track section is shunted by a car, holding circuit means for maintaining route descriptions stored by the storage means associated with said given track switch whenever the associated detector track section is unoccupied, and alternate holding circuit means including series-connected front contacts of the respective switch repeater relays for holding route descriptions stored in the storage means associated with said given track switch at times when the associated detector track section is occupied.

5. In an automatic switching system for controlling a plurality of track switches having respective detector track sections in a classification yard, storage means associated with each of the track switches for storing route descriptions for the routing of cars to be classified, switch control means for operating each of the switches in accordance with the stored route description of its associated storage means, normally deenergized transfer relays associated with routes over the normal and reverse positions of a given one of the track switches for the transfer of storages of route descriptions, normally deenergized switch repeater relays associated respectively with the normal and reverse positions of said given track switch, circuit means responsive to the storage of a route description by the storage means associated with said given track switch for energizing either one or the other of said switch repeater relays in accordance with the position of said given track switch, said circuit means being rendered effective in energizing a particular one of said switch repeater relays only when the one of said transfer relays associated with the same position of said given track switch is deenergized, circuit means responsive to the shunting of the detector track section associated with said given track switch for energizing either one or both of said transfer relays, said circuit means being effective in energizing both of said transfer relays only when one of said switch repeater relays is energized to indicate a track switch position in correspondence with the position called for by a route description stored in the associated storage means, holding circuit means for holding route descriptions stored in the storage means associated with said given switch, said holding circuit means being effective whenever either one of said transfer relays or both of said switch repeater relays are deenergized when the detector track section associated with said given switch is shunted, said holding circuit means being effective also whenever both of said transfer relays are deenergized when said detector track section is unoccupied.

6. In an automatic switching system for controlling a plurality of track switches having respective detector track sections in a classification yard, storage means associated with each of the track switches for storing route descriptions for the routing of cars to be classified, switch control means for operating each of the track switches in accordance with the stored route description of the associated storage means, a normally deenergized transfer relay and a normally deenergized switch repeater relay associated with each position of a given track switch, pick-up circuit means for each of said switch repeater relays including a back contact of the associated transfer relay, said pick-up circuit means being rendered effective when a route description is stored by the storage means associated with said given track switch and correspondence exists between the actual position of said given track switch and the position called for by a route description, stick circuit means for energizing said switch repeater relays when a route description is stored by the associated storage means, correspondence pick-up circuit means for energizing each of said transfer relays in response to the occupancy of the detector track section associated with said given track switch by a cut of cars, said correspondence pick-up circuit means for each transfer relay including a front contact of the associated switch repeater relay and being rendered effective only when the actual and called-for positions of said given track switch are in correspondence, direct pick-up circuit means for energizing each of said transfer relays in response to the occupancy of the detector track section associated with said given track switch by a cut of cars, said direct pick-up circuit means being effective in energizing one of said transfer relays only when a stored route description calls for a position of said given track switch associated with the other of said transfer relays, stick circuit means for energizing said transfer relays when the detector track section associated with said one track switch is occupied, alternate stick circuit means for each of said transfer relays including a back contact of the other of said transfer relays, said alternate stick circuit means being operable when a route description is stored by the storage means associated with said given track switch, circuit means including series-connected back contacts of said transfer relays for holding route descriptions stored by the storage means associated with said given track switch when the associated detector track section is unoccupied, a plurality of circuit means including back contacts of said transfer relays, respectively, for holding route descriptions stored in said associated storage means when the associated detector track section is occupied, and circuit means including series connected back contacts of said switch repeater relays for holding route descriptions stored by the associated storage means when the associated detector track section is occupied.

7. In an automatic switching system for controlling a plurality of track switches having respective detector track sections in a railway classification yard, storage means associated with each of the track switches for storing route descriptions for routing cars to be classified, switch control means for operating each of the track switches in accordance with the stored route description of the associated storage means, transfer circuit means associated with a given one of the track switches, said transfer circuit means being operable to transfer route descriptions into the associated storage means whenever said storage means is vacant, normally deenergized switch repeater relays associated with the normal and reverse positions of said given track switch, circuit means responsive to the storage of route descriptions by the storage means associated with said given track switch for energizing one or the other of said switch repeater relays in accordance with the position of said given track switch, circuit means for energizing both of said switch repeater relays whenever said transfer means is operated at a time when the detector track section associated with said given switch is shunted, stick circuit means for holding said switch repeater relays energized when the associated detector track section is occupied, and holding circuit means for holding route descriptions stored in the storage means associated with said given track switch, said holding circuit means being effective either when the associated detector track section is unoccupied or when said detector track section is occupied and both of said switch repeater relays are energized.

8. In a system for controlling track switches in a classification yard, each of the track switches having an associated detector track section and being operatively connected to an electroresponsive switch machine and a point detector device, storage means associated with a given one of the track switches for storing route descriptions of selected characters for routing respective cuts of cars over said given track switch, manual control means operable to select a position to be assumed by said given track switch irrespective of the character of any route description stored by said storage means, a normally energized slow-acting timing relay having a release time substantially equal to the operating time of the switch machine associated with said given track switch, circuit means including contacts of said timing relay and being responsive to operations of said manual control means and/or to route descriptions stored by said storage means for selectively operating the switch machine connected to said given track switch, whereby said switch machine is operated to a particular position called for whenever said timing relay is energized, but is operated to a position opposite to that called for whenever said timing relay is deenergized, normally deenergized switch repeater relays associated with respective operating positions of said given track switch, circuit means responsive to operations of said manual control means and/or to route descriptions stored by said storage means for selectively energizing one or the other of said switch repeater relays whenever the operated positions of the associated switch machine and point detector device are in correspondence, stick circuit means for energizing said timing relay, said stick circuit means being effective either when one or the other of said switch repeater relays is energized or when said switch repeater relays are deenergized and correspondence exists between the operated positions of the switch machine and point detector device associated with said given track switch, pick-up circuit means for energizing said timing relay whenever the detector track section associated with said given track switch is occupied, and manually controlled pick-up circuit means for energizing said timing relay in response to operations of said manual control means and said switch repeater relays.

9. In an automatic switching system for classification yards, a track switch having an associated detector track section, an electroresponsive switch machine operatively connected to said track switch, said switch machine having electrical contacts operable to close in respective operating positions of said switch machine, point detection means operatively connected to said track switch and having electrical contacts operable to close in respective fully operated positions of said track switch, storage means associated with said track switch for storing route descriptions for cuts of cars, manually operable control means associated with said track switch and having operating positions corresponding with track switch positions, a normally energized slow-acting timing relay associated with said track switch and having a release time substantially equal to the operating time of said switch machine, normally deenergized switch repeater relays, one for each operating position of said track switch, circuit means responsive to operations of either said storage means or said manually operable means for selectively operating said switch machine dependent upon the condition of said timing relay, whereby said switch machine is operated to a called-for position if said timing relay is energized and is operated to the position opposite to that called for if said timing relay is deenergized, circuit means for selectively energizing said switch repeater relays in response to operations of said storage means and/or said manually operable control means and in accordance with the positions of and correspondence between the positional contacts of said switch machine and said point detector, stick circuit means effective when correspondence exists between positional contacts of said switch machine and said point detector for energizing said timing relay when said switch repeater relays are deenergized, stick circuit means for said timing relay effective when either of said switch repeater relays is energized and the associated detector track section is vacant, pick-up circuit means for energizing said timing relay when the associated detector track section is occupied, and pick-up circuit means responsive to operations of said manually operable control means and to the energization of one or the other of said switch repeater relays for energizing said timing relay provided that correspondence exists between the switch positions called for and indicated by, respectively, said manually operable control means and said switch repeater relays.

References Cited in the file of this patent

UNITED STATES PATENTS 2,700,728 Brixner et al. ---------- Jan. 25, 1955